US011406986B2

(12) United States Patent
Kjaersgaard et al.

(10) Patent No.: US 11,406,986 B2
(45) Date of Patent: Aug. 9, 2022

(54) COMMINUTION APPARATUS AND A METHOD FOR PERFORMING SERVICE OF SUCH AN APPARATUS

(71) Applicant: M&J Denmark A/S, Horsens (DK)

(72) Inventors: Johannes Kjaersgaard, Vejle (DK); Tommy Langelund Jakobsen, Hedensted (DK)

(73) Assignee: M&J Denmark A/S, Horsens (DK)

(*) Notice: Subject to any disclaimer, the term of this patent is extended or adjusted under 35 U.S.C. 154(b) by 37 days.

(21) Appl. No.: 16/644,830

(22) PCT Filed: Sep. 6, 2018

(86) PCT No.: PCT/EP2018/073974
§ 371 (c)(1),
(2) Date: Mar. 5, 2020

(87) PCT Pub. No.: WO2019/048530
PCT Pub. Date: Mar. 14, 2019

(65) Prior Publication Data
US 2021/0069722 A1   Mar. 11, 2021

(30) Foreign Application Priority Data

Sep. 7, 2017   (EP) ..................................... 17189856

(51) Int. Cl.
*B02C 18/18* (2006.01)
*B02C 18/00* (2006.01)
(Continued)

(52) U.S. Cl.
CPC .......... *B02C 18/18* (2013.01); *B02C 18/0084* (2013.01); *B02C 18/0092* (2013.01);
(Continued)

(58) Field of Classification Search
CPC . B02C 18/18; B02C 18/0084; B02C 18/0092; B02C 18/142; B02C 18/16; B02C 18/14; B02C 18/24
See application file for complete search history.

(56) References Cited

U.S. PATENT DOCUMENTS

RE37,550 E    *  2/2002  Chambers, Sr. .... B02C 18/0092
                                                  241/101.2
2012/0037741 A1 * 2/2012  Wu .................... B02C 18/0007
                                                  241/285.1
(Continued)

FOREIGN PATENT DOCUMENTS

CN           2261293 Y        9/1997
CN           2475468 Y        2/2002
(Continued)

OTHER PUBLICATIONS

International Search Report and Written Opinion for International Application No. PCT/EP2018/073974 dated Dec. 10, 2018.
(Continued)

*Primary Examiner* — Faye Francis
(74) *Attorney, Agent, or Firm* — Andrus Intellectual Property Law, LLP

(57) ABSTRACT

A comminution apparatus, a method for replacing wear parts of such an apparatus and a cutting table unit for use in such an apparatus. The apparatus includes a cutting module, a drive module and a top module. The main wear parts are present in the cutting module, which may be replaced, in its entirety or in part, without disconnecting the drive module from the apparatus or from an external power source.

15 Claims, 24 Drawing Sheets

(51) Int. Cl.
    *B02C 18/14*     (2006.01)
    *B02C 18/16*     (2006.01)
    *B02C 18/24*     (2006.01)

(52) U.S. Cl.
    CPC ............ *B02C 18/14* (2013.01); *B02C 18/142* (2013.01); *B02C 18/16* (2013.01); *B02C 18/24* (2013.01); *B02C 2018/162* (2013.01); *B02C 2018/188* (2013.01)

(56) References Cited

U.S. PATENT DOCUMENTS

| | | | |
|---|---|---|---|
| 2014/0166789 A1* | 6/2014 | Yamamoto | B02C 18/0007 241/101.5 |
| 2016/0089676 A1* | 3/2016 | Tondelli | B02C 18/18 241/243 |
| 2016/0228879 A1 | 8/2016 | Scharfe | |
| 2018/0126388 A1* | 5/2018 | Neufeldt | B66F 3/24 |
| 2021/0094041 A1* | 4/2021 | Sabol | B02C 18/16 |

FOREIGN PATENT DOCUMENTS

| | | | |
|---|---|---|---|
| CN | 104190515 A | 8/2014 | |
| CN | 106179657 A | 12/2016 | |
| DE | 102010031685 A1 * | 1/2012 | ........... B02C 18/142 |
| DE | 102010031685 A1 | 1/2012 | |
| EP | 0009513 A2 | 4/1980 | |
| EP | 2394742 A1 | 12/2011 | |
| RU | 2140822 C1 | 11/1999 | |
| RU | 2172244 C1 | 8/2001 | |
| WO | 9710057 A1 | 3/1997 | |
| WO | 2006137033 A1 | 12/2006 | |
| WO | 2015039855 A1 | 3/2015 | |

OTHER PUBLICATIONS

Extended European Search Report for European Application No. 17189856.2 completed Nov. 22, 2017.
Chinese Office Action for Chinese Application No. 201811037965.2 dated Mar. 27, 2020.
Translation of Office Action for corresponding Russian Patent Application No. 2020109518/10 dated Dec. 2, 2021.

* cited by examiner

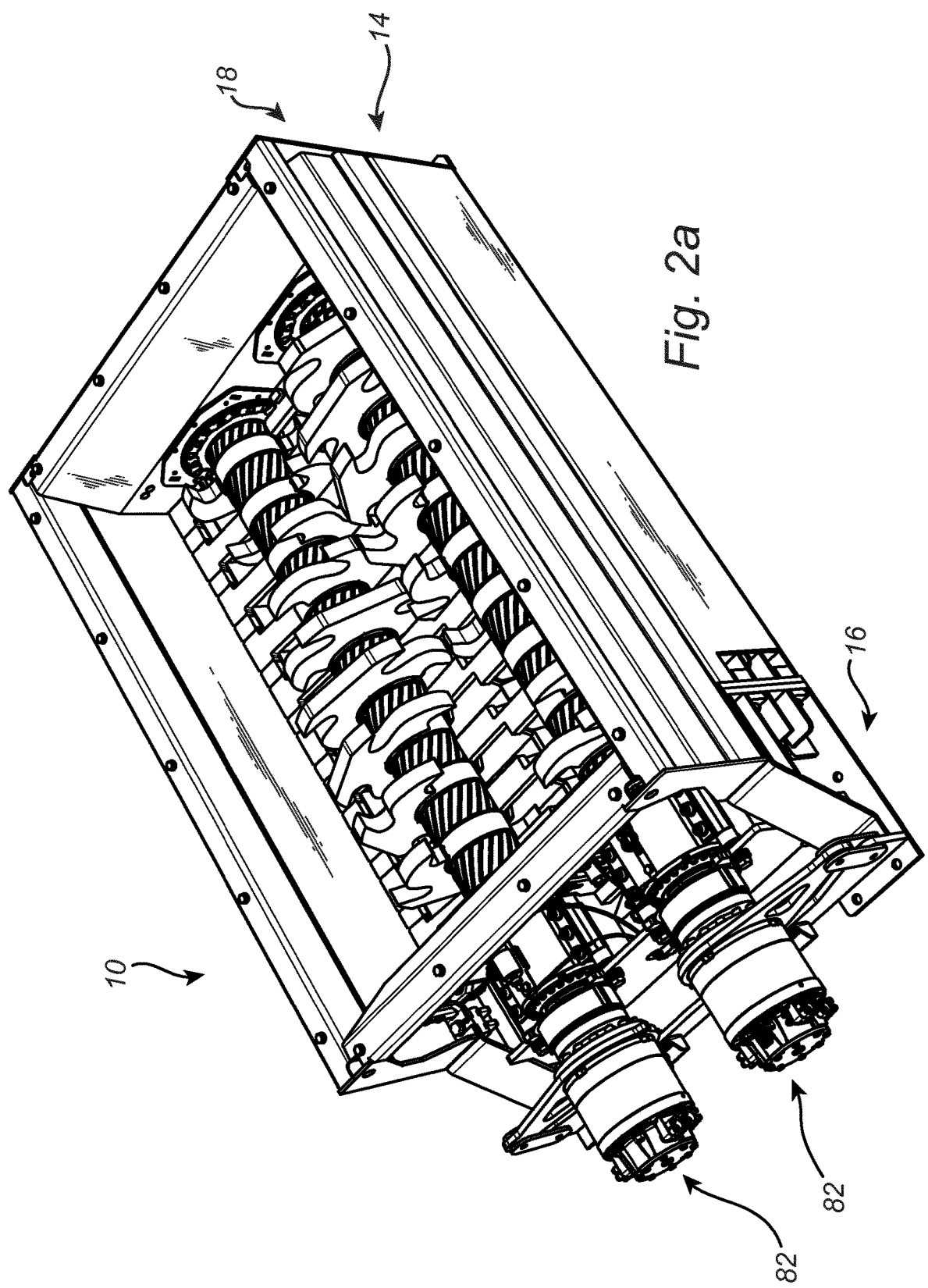

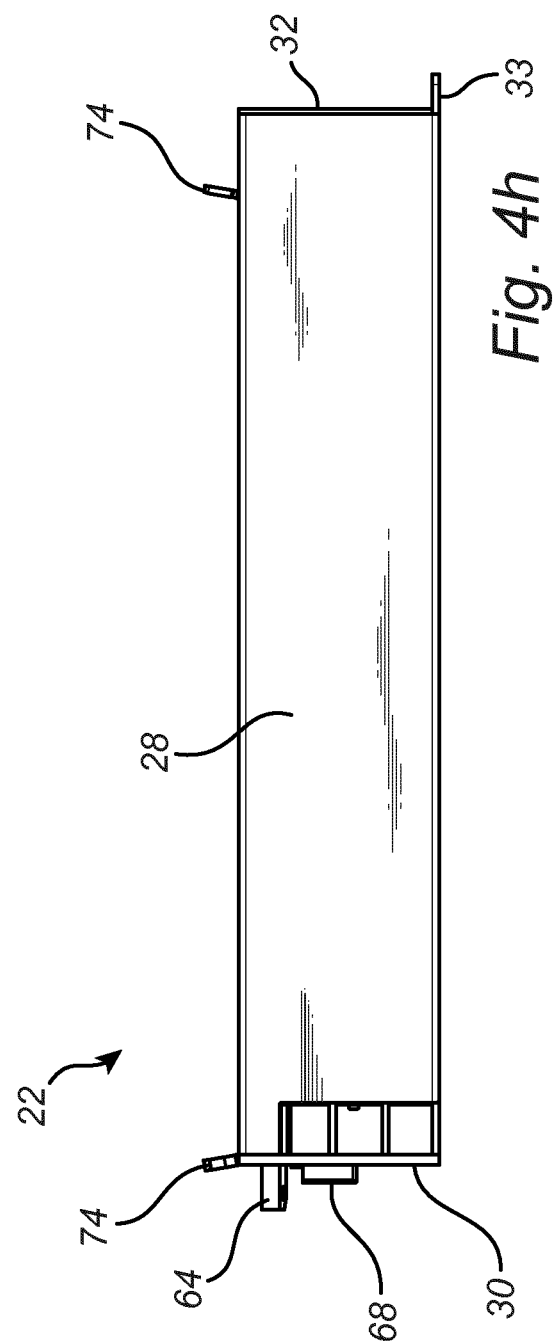

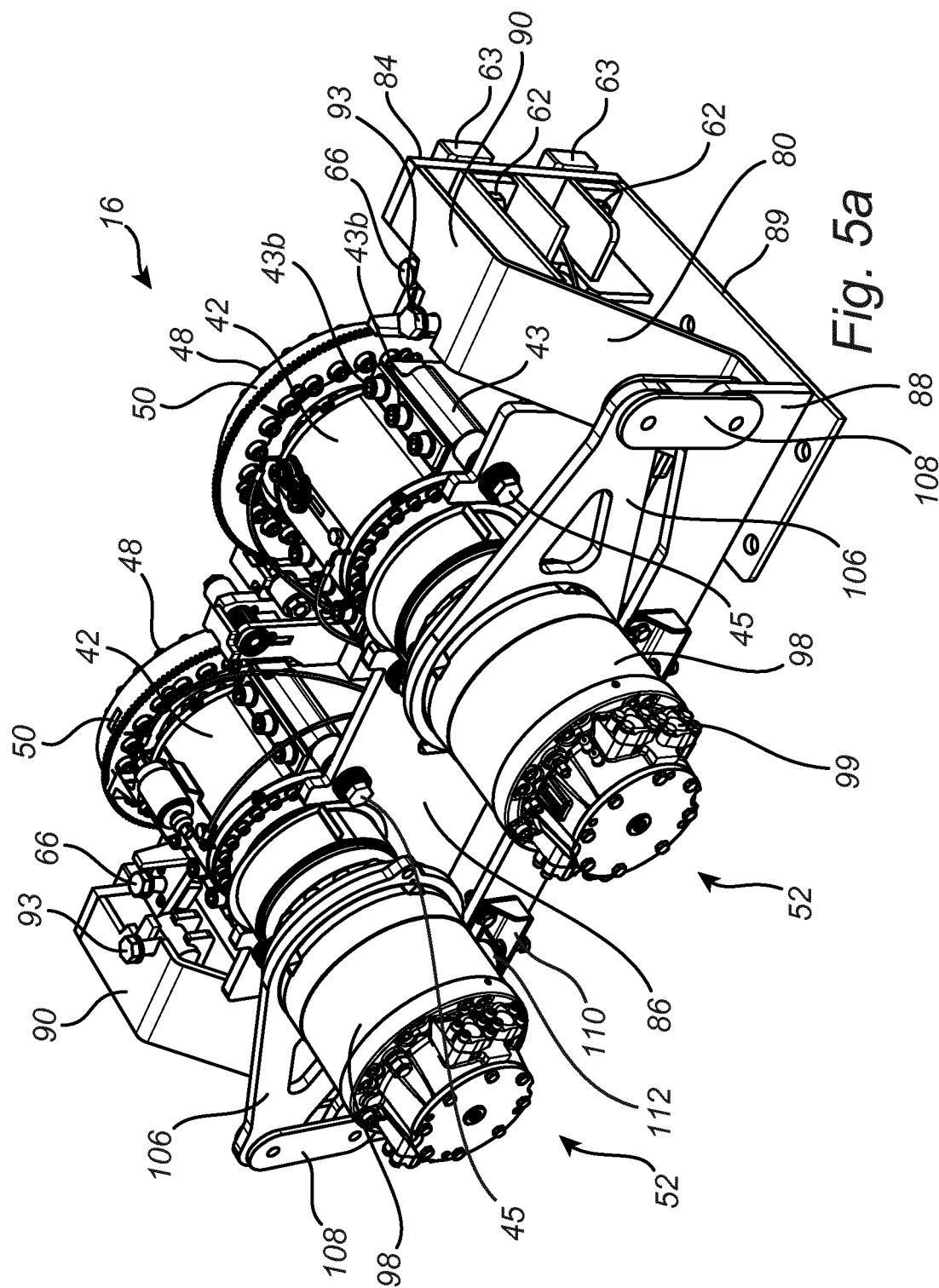

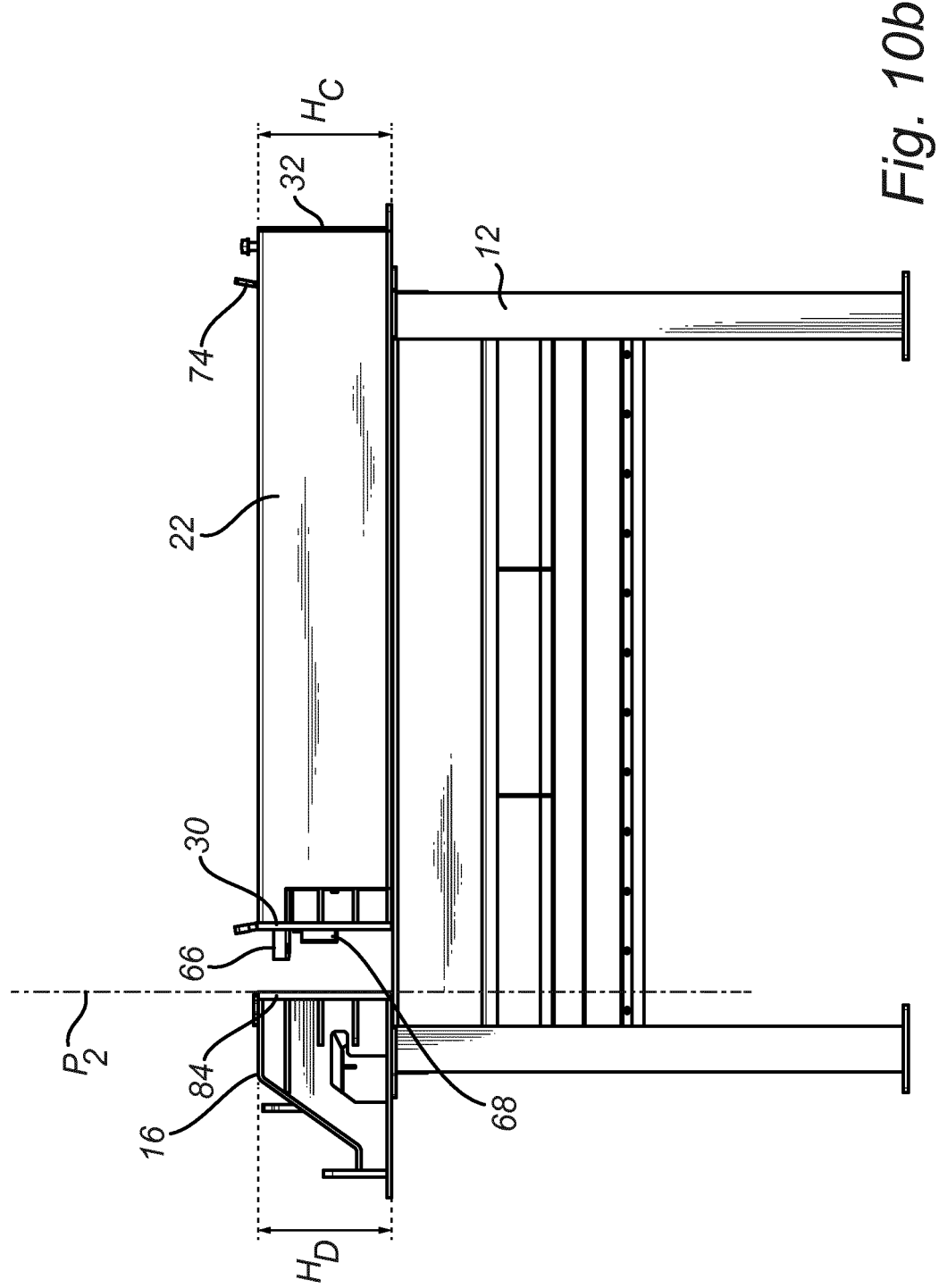

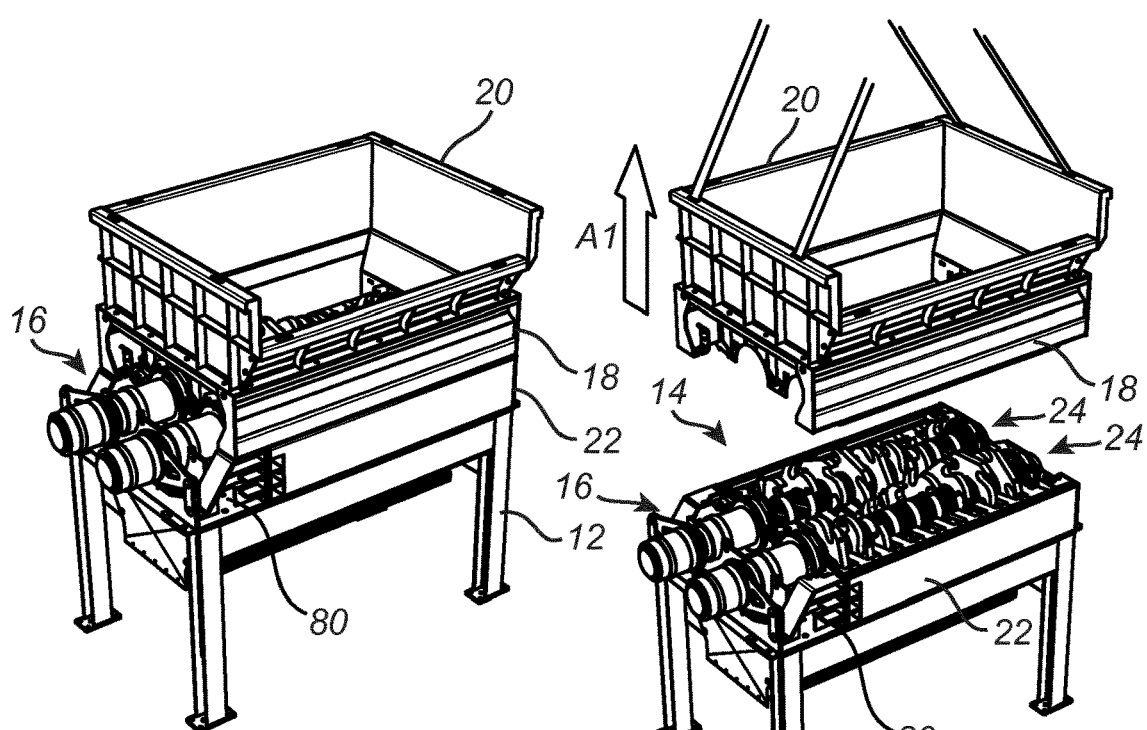
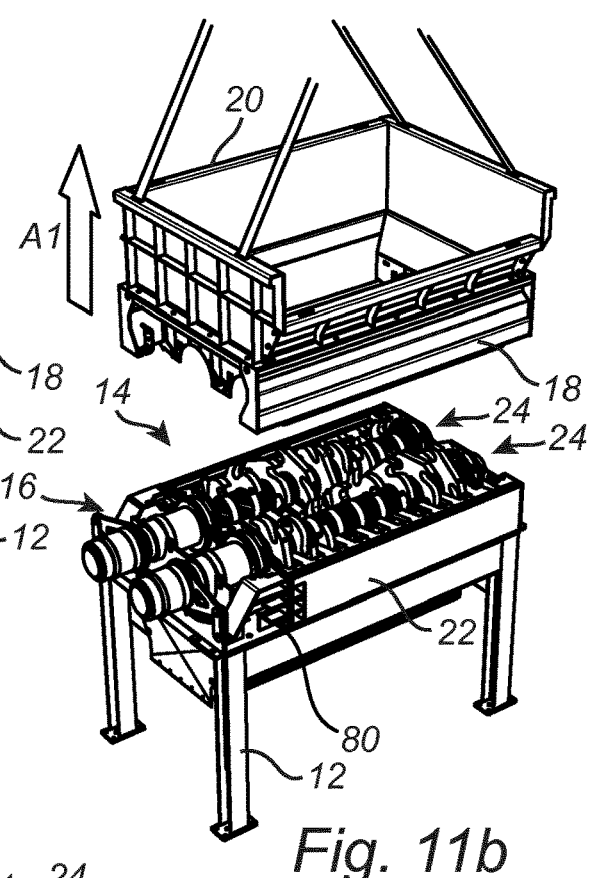
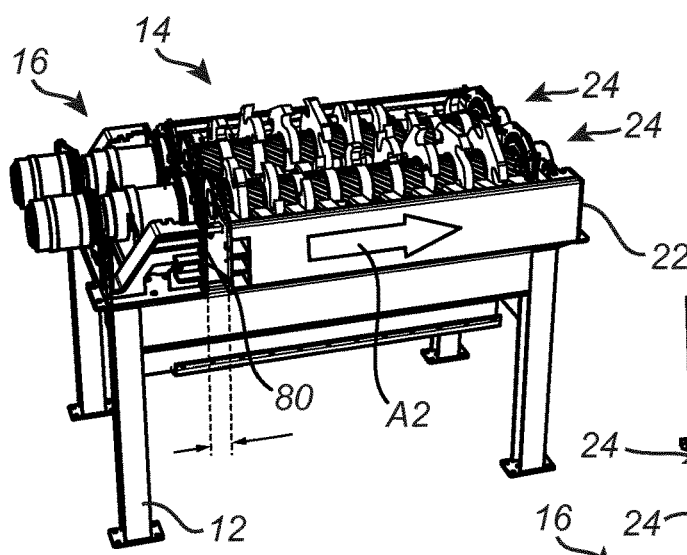
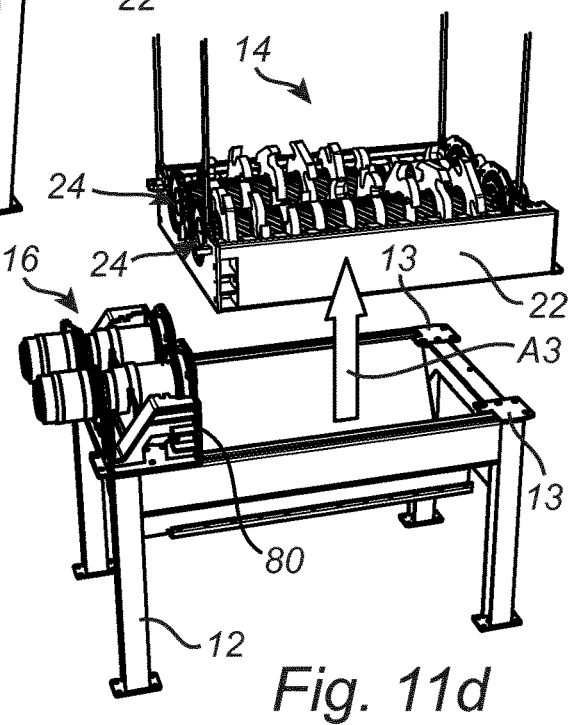
Fig. 11a
Fig. 11b
Fig. 11c
Fig. 11d

COMMINUTION APPARATUS AND A METHOD FOR PERFORMING SERVICE OF SUCH AN APPARATUS

CROSS REFERENCE TO RELATED APPLICATIONS

This application is the U.S. national stage application of International Application PCT/EP2018/073974, filed Sep. 6, 2018, which international application was published on Mar. 14, 2019, as International Publication No. WO 2019/048530 A1 in the English language. The International Application claims priority of EP Patent Application No. 17189856.2, filed Sep. 7, 2017.

TECHNICAL FIELD

The inventive concept relates to the field of comminution apparatuses for comminuting various material, such as waste materials.

BACKGROUND

Prior-art comminution apparatuses, also referred to as shredders, are used for comminuting (by cutting, shredding and shearing) wood, metal parts, rubber and plastic material, garbage and other waste material, material for recycling or material for fuel. Such operation may be performed in connection with incineration, hazardous waste, demolition wood, domestic or industrial waste material, waste-to-energy conversion, recycling, landfills, etc.

One type of prior-art comminution apparatus comprises one or more rotatable cutting shafts provided with transversely extending cutting knives. One or more sets of transversely extending fixed counter knives define a stationary cutting table for receiving waste material to be comminuted. The counter knives in each set are mutually separated by openings through the cutting table. The rotating knives extend partly down into said openings and co-operate with the counter knives for comminuting the waste material. The comminuted waste material falls down through said openings. Prior-art comminution apparatuses of this kind are disclosed in WO 97/10057 and WO 2006/137033.

Although such prior-art comminution apparatuses are advantageous and effective in many aspects, there is still a need for further improvements, especially with respect to time and cost needed for service and for replacement or substitution of wear parts. It is of outmost importance to reduce the down-time of such machines as much as possible, considering that they may operate almost constantly, e.g. for 20 hours of 24 hours, and the down-time may affect the operation of a whole recycling plant. The present inventive concept addresses such needs.

EP 2 394 742 discloses a comminution apparatus including a supporting structure in which a cassette with stationary cutting knives are arranged. This prior-art apparatus suffers at least from the problem of not being strong and stable enough to handle the very high forces acting on the machine, especially on the knives, during operation.

SUMMARY OF INVENTION

According to a first aspect of the inventive concept, there is provided a comminution apparatus for comminuting waste material, such as domestic or industrial waste material, bulk objects or the like, said apparatus comprising:
a supporting structure,
a cutting module being arranged on the supporting structure,
a top module defining a housing for receiving waste material to be comminuted and being detachably connected to the cutting module at first interface, and
a drive module being arranged on the supporting structure next to the cutting module;
wherein said cutting module includes:
a stationary cutting table unit which has an engagement side facing the drive module and a one or more sets of fixed counter knives which define a cutting table forming a bottom of said housing, the counter knives in each set being mutually separated by openings through the cutting table, and
one or more rotatable cutting shafts which extends in an axial direction, each shaft being provided with a set of rotating knives which partly extend down into said openings through the cutting table and which during operation of the apparatus cooperate with the counter knives for comminuting the waste material;
wherein said drive module includes:
a stationary drive module body which has an engagement side facing the cutting module and which is connected the supporting structure, and
one or more drive units which are supported by the drive module body and arranged to rotatably drive said cutting shafts;
wherein the engagement side of the cutting table unit and the engagement side of the drive module body are directly and detachably interconnected at a second interface extending transversally to the axial direction between the cutting module and the drive module; and
wherein the cutting shafts are detachably connected to the drive units.

According to a second aspect of the inventive concept, there is provided a method for replacing wear parts of a comminution apparatus arranged to comminute waste material, such as domestic or industrial waste material, bulk objects or the like, wherein said method is performed on a comminution apparatus which comprises:
a top module defining a housing for receiving and accommodating said waste material,
a cutting module being arranged under the top module and including one or more rotatable cutting shafts with rotating knives, and a cutting table unit with stationary counter knives co-operating with said rotating knives, and
a drive module being arranged next to the cutting module and including a cutting module body which is directly and detachably connected to the cutting table unit at an interface being located between the cutting module and the drive module and extending transversally to the cutting shafts, and which supports one or more drive units for driving said cutting shafts;
and wherein said method comprises the following steps:
disconnecting and removing the top module for obtaining access to the cutting module;
disconnecting the cutting module from the drive module by disconnecting the cutting table unit from the drive module body, and by disconnecting the cutting shafts from the drive units;
removing the cutting module; and
replacing at least the cutting table unit with a replacement cutting table unit by detachably connecting the replacement cutting table unit to the cutting module body at said interface.

Preferred embodiments of the inventive concept are set out in the dependent claims.

The inventive concept presents at least the following advantages:

According to the inventive concept, a user does not have to—as with the prior-art apparatus—replace an entire unitary main body of the apparatus when wear parts have to be replaced. In the prior-art apparatus, the main body of the apparatus is a large and heavy unitary body which is designed to handle the strong forces acting on the machine during operation and which for this purpose is welded together as a unitary body. According to the inventive concept, when replacing wear parts of the apparatus non-worn parts does not have to be replaced, which is a substantial advantage not only from a cost perspective but also with respect to the time required for performing the replacement. Thus, the down-time may also be substantially reduced.

According to the inventive concept, a user does not have to—as with the prior-art apparatus—disconnect the drive units during service and replacement. In the inventive apparatus, the drive module does not have to be disconnected when replacing the cutting module. The drive module may remain connected to a support structure. In the prior-art, the drive units, including heavy bearings and heavy drive motors, are mounted in the main unitary body and, therefore, must be disconnected from the main unitary body to be replaced, lifted down on a floor or the like during service and thereafter reconnected to and aligned in the new main body. This time consuming work can be completely avoided in accordance with the inventive concept.

A specific advantage offered by the inventive concept in cases where the drive units include hydraulic motors is that such hydraulic motors may remain connected via hydraulic hoses to an external hydraulic power source during replacement of the cutting module. In the prior art, the hydraulic motors have to be disconnected from and reconnected to the hydraulic hoses during the replacement operation, which is a both time consuming operation and an operation involving risks of contaminating the hydraulic system.

Since only the cutting module, in its entirety or in part, has to be transported during a replacement operation, the prior-art disadvantage of lifting, transporting and handling a large unitary main body is avoided. This may be a substantial advantage in certain comminution plants where it is difficult to transport such large unitary replacement bodies to and from the location of the apparatus.

A further advantage offered by the inventive concept is that when the top module is removed, the service staff will have an improved access to the cutting module and to the drive module. This involves for instance easy access to coupling flanges interconnecting the cutting shafts with the drive units. It also involves easy service access to the cutting module from side of the apparatus, without having to work from inside the cutting area as required is the case in the prior-art apparatus with a unitary welded main body, where the service staff has to go down into the machine and perform service operations standing on the cutting table.

Another advantage which may be offered by the inventive concept relates to removal of the cutting shafts. The design of the prior-art apparatus is such that the cutting shafts normally have to be lifted up with an angle in order to be removed from the apparatus. This disadvantage may be avoided according to the inventive concept, since the removal of the top module may give full access to the cutting shafts, which may be lifted vertically off from the apparatus, without any need of first angling the shafts.

It may also be noted that the inventive concept offers advantages even if the wear parts are actually not worn out. The inventive concept allows the user to easily substitute a different cutting module for a present cutting module, in its entirety or in part, for instance for handling a different type of waste material.

A further advantage of the inventive concept is that the cutting module and the drive modules are detachably interconnected at the engagement sides of the cutting table unit and the drive module body, respectively. These engagement sides are directly and detachably connected to each other at the second interface extending between the cutting table unit and the drive module body. This design provides a module interconnection which is strong enough to handle the strong forces present during operation of the apparatus.

In the present disclosure, the term "waste material" may comprise at least the types of material referred to in the introductory paragraph, e.g. waste material, material for recycling and material for fuel.

In the present disclosure, the term "axial direction" refers to the longitudinal direction of the rotating shafts. In the axial direction, the terms "proximal" and "distal" refers to positions in relation to the cutting module. The term "transverse direction" refers to a substantially horizontal direction perpendicular to the axial direction. The term "vertical direction" refers to a substantially or mainly vertical direction, including also directions deviating somewhat from an exactly vertical direction.

In the present disclosure, the term "replacing" with respect to the cutting module, in its entirety or in part, should be interpreted to cover situations where the cutting module is worn out and has to be replaced with a new replacement cutting module, as well as situations where the cutting module is actually not worn out but rather needs to be replaced, in its entirety or in part, with a different cutting module, for example in order to comminute a different type of waste material. Thus, the term "replacing" especially covers this second situation also where a different cutting module is substituted for cutting module presently being use.

Embodiments of the Inventive Concept

In some embodiments, the cutting shafts are detachably connected to the drive units substantially along the second interface. Thereby, the direct and detachable connection between the cutting table unit and the drive module body, on the one hand, and the detachable connection between the cutting shafts and the drive units, on the other hand, are both located substantially in the same interface. This interface may extend along a substantially vertical interface plane. Thus, removing and replacing the cutting module may be performed in one and the same vertical interface plane.

In some embodiments, the cutting table unit of the cutting module is also detachably connected to the supporting structure. The drive module may also be detachably connected to the supporting structure. Thereby, the modular design the drive modules makes it possible to customize each apparatus by selecting a proper drive module and a proper cutting module for each specific use. Such a supporting structure may include a substantially horizontal support area for the cutting module and the drive module. During replacement, the new cutting module may be lifted down on the support area and thereafter slid horizontally into contact with the drive module. As an alternative, the modules may be designed such that the cutting module may be lowered vertically directly into its final position in engagement with the drive module.

In some embodiments, the cutting table unit may include, in addition to the counter knives, a substantially rectangular frame in which the counter knives are fixedly arranged. Such a frame may be formed by two axially extending side walls, a transversally extending distal end wall and a transversally extending proximal end wall, wherein the proximal end wall of the frame defines the engagement side of the cutting table unit.

In some embodiments, the engagement side of the cutting table unit and the engagement side of the drive module body are directly and detachably interconnected at the second interface via different connections being structured and arranged to transfer forces acting in associated different directions. Such different connections may be structured and arranged, during the operation of the apparatus, to transfer axial, vertical and transverse forces acting in the interface between the cutting module and the drive module. The different connections may comprise at least a first connection which is structured and arranged to transfer mainly said axial forces, at least a second connection which is structured and arranged to transfer mainly said vertical forces, and at least a third connection which is structured and arranged to transfer mainly said transversal forces.

In some embodiments, the top module may extend also over at least a part of the drive module. In such embodiments, the top module and the drive module body may also be detachably interconnected, optionally in a plane substantially coinciding with the interface between the top module and the drive module. The interconnected cutting module and drive module may together form a rectangular top area the horizontal dimensions of which match the horizontal dimensions of a rectangular bottom area of the top module.

In some embodiments, each cutting shaft may be detachably connected to its associated drive unit via coupling flanges which are axially located in or adjacent a flange opening formed by the cutting table unit and the top module in combination. This flange opening may be formed by a lower semi-circular opening formed in a proximal end wall of the cutting table unit and a vertically aligned upper semi-circular opening formed in a proximal end wall of the top module. In the assembled state of the apparatus, the coupling flanges located in said flange opening may provide an efficient seal preventing waste material from entering into the drive module from the cutting area. During service, when the top module is removed and, thereby, the top part of the flange opening is removed, the cutting shafts are free to be lifted away separately from the cutting table unit if needed. Also, this design will facilitate the operation of disconnecting the coupling flanges from each other.

In some embodiments, a hopper may be supported by and detachably connected to the top module.

In some embodiments, especially for large-size versions of the apparatus, the above-mentioned drive module constitutes a first drive module in a pair of a first and a second drive module, which are located next to the cutting module at opposite sides thereof, such that each cutting shaft may be driven by two drive units, one at each end of the shaft. In such an embodiment, the top module may extend over at least a part of each drive module. In such a twin-drive module embodiment, the cutting table unit may have a second engagement side facing the second drive module. The second drive module may include:

a second drive module body having an engagement side facing the cutting module and being connected to the supporting structure, and one or more drive units being supported by the second drive module body and arranged to rotatably drive the cutting shafts together with the drive units of the first drive module.

The second engagement side of the cutting table unit and the engagement side of the second drive module body may then be directly and detachably interconnected at a third interface extending between the cutting module and the second drive module transversally to the axial direction. The cutting shafts may be detachably connected to the drive units of the second drive module.

Since the cutting table unit in this embodiment is directly and detachably connected to the two opposite drive modules, the cutting table unit may in some embodiments be supported on but not connected directly to the supporting structure.

BRIEF DESCRIPTION OF THE DRAWINGS

The inventive concept, a non-limiting embodiment and further advantages of the inventive concept will now be further described with reference to the drawings.

FIG. 2a is a perspective view and FIG. 2b is a top view of the apparatus.

FIGS. 4c to 4h show a cutting table unit.

FIG. 5a shows a drive module.

FIGS. 10a and 10b illustrate the detachable connection between the top module and the cutting table unit.

FIGS. 11a to 11d and FIGS. 12a to 12d illustrate method steps for replacing a cutting module.

DETAILED DESCRIPTION OF A PREFERRED EMBODIMENT

Figure 1:
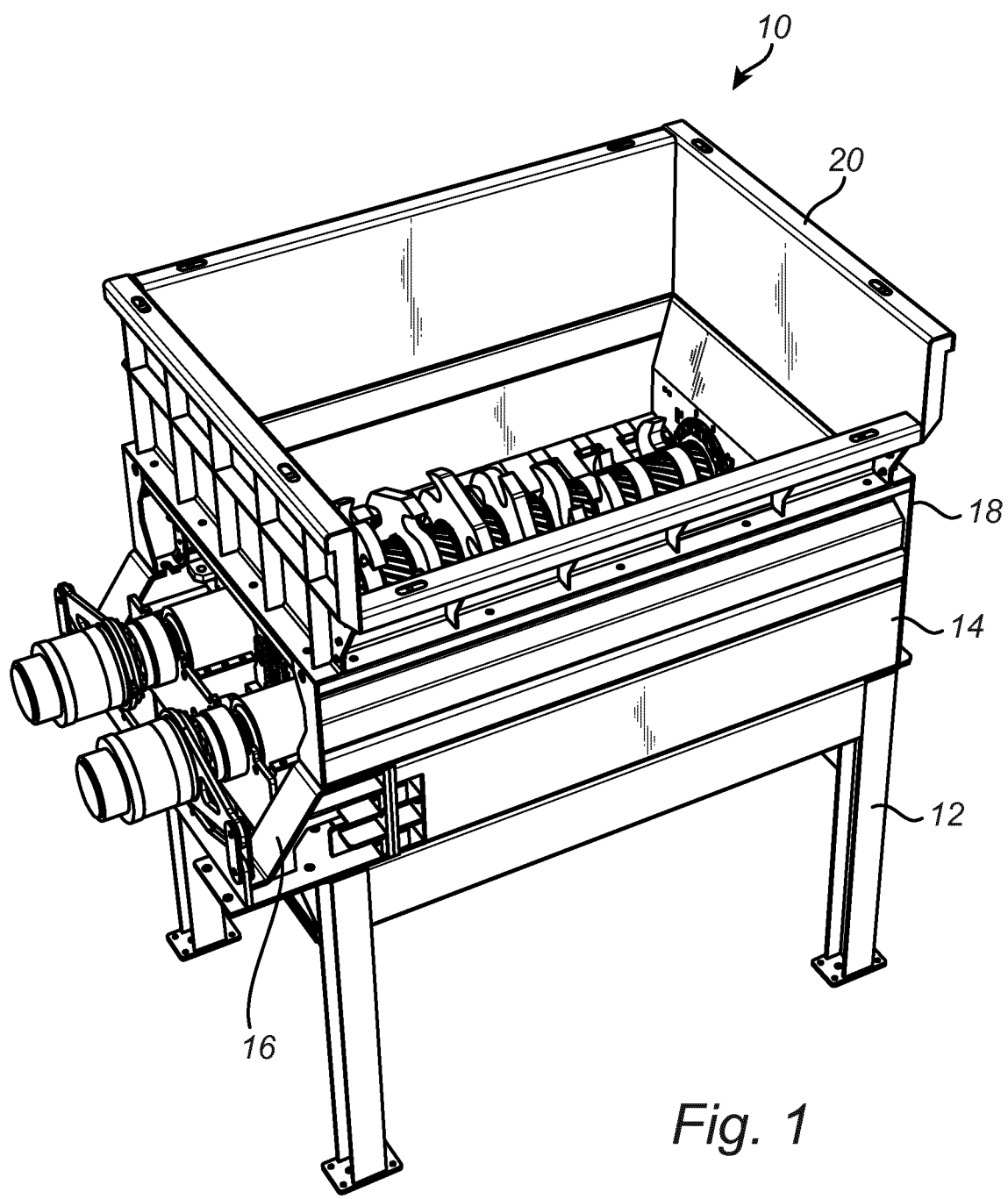
FIG. 1 shows an embodiment of a comminution apparatus according to the inventive concept.
Figure 2B:
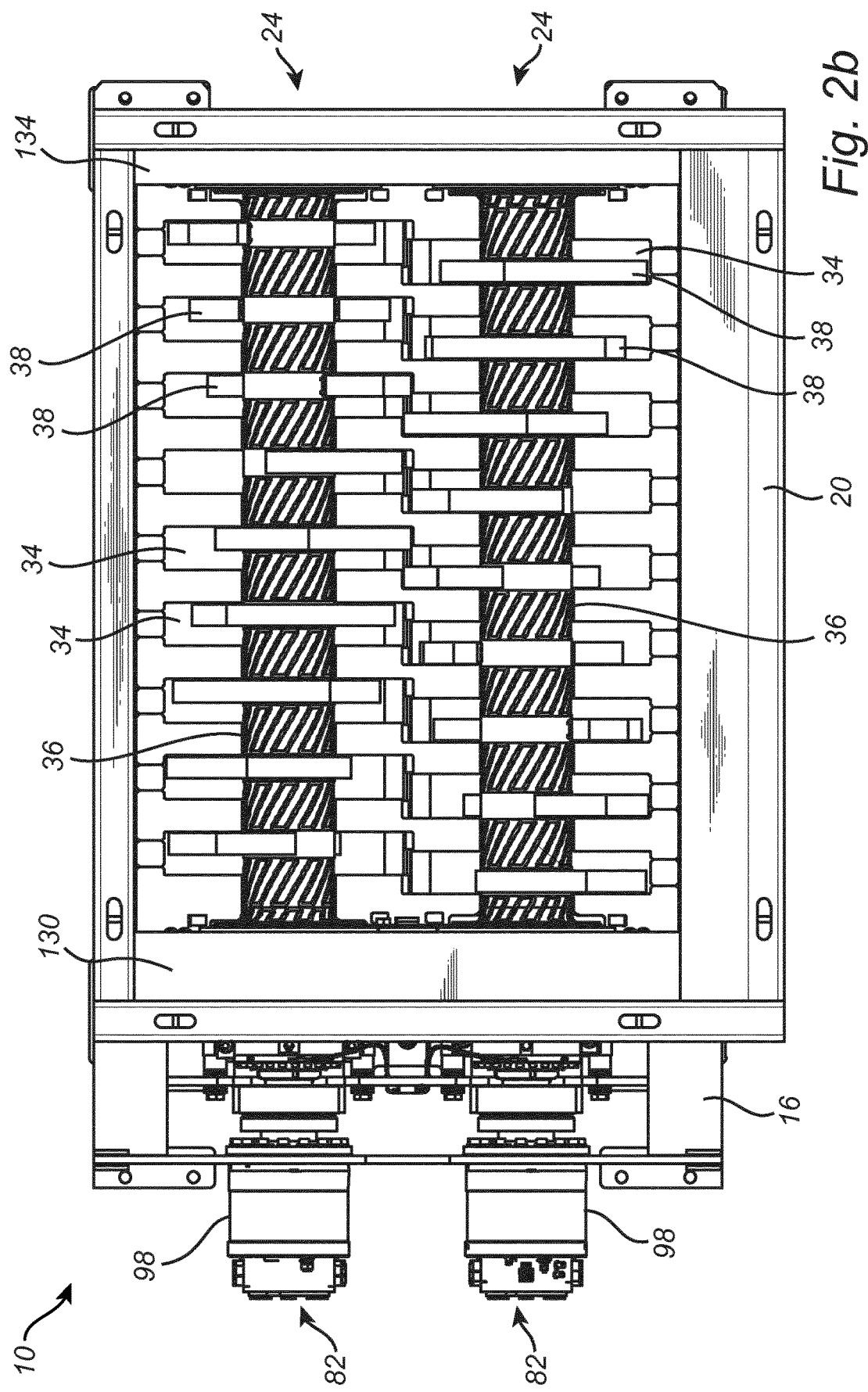

FIGS. 1, 2a and 2b illustrate an embodiment of a modular comminution apparatus 10 according to the inventive concept, shown in its assembled state. The apparatus 10 has to its purpose to comminute waste material (not shown), such as domestic or industrial waste material, bulk objects or the like, by a cutting/shredding operation. The shredding capacity may differ substantially and as an example it may lie in the range of 5 to 200 tons of waste material per hour.

The illustrated apparatus 10 is intended for stationary use and is mounted on a stationary chassis 12. Other embodiments may be mobile where the chassis 12 may be replaced with some other supporting structure. The apparatus 10 comprises a cutting module 14 which is positioned on and supported by the chassis 12, a drive module 16 which is positioned on and supported by the chassis 12 next to the cutting module 14, and a top module 18 which is arranged on top of the cutting module 14. The top module 18 may optionally extend horizontally over the drive module 16 as in the illustrated embodiment. The cutting module 14 is detachably connected to the chassis 12 (at reference numerals 13 and 33 in FIGS. 3 and 4d). The drive module 16 is preferably also detachably connected to the chassis 12 (at reference numerals 15 and 89 in FIGS. 3 and 5a). The top module 18 is detachably connected to the cutting module 14 (at reference numerals 72 and 127 in FIGS. 4c and 8b) and to the drive module 16 (at reference numerals 91 and 126 in FIGS. 5b and 8b).

The apparatus 10 may also comprise a feed hopper 20 mounted on the top module 18. In simpler embodiments, the hopper 20 may be integrally formed with the top module 18 but it is advantageously designed as a separate, detachably connected unit which may be customized for each user and adapted to the waste type, etc.

Figure 3:
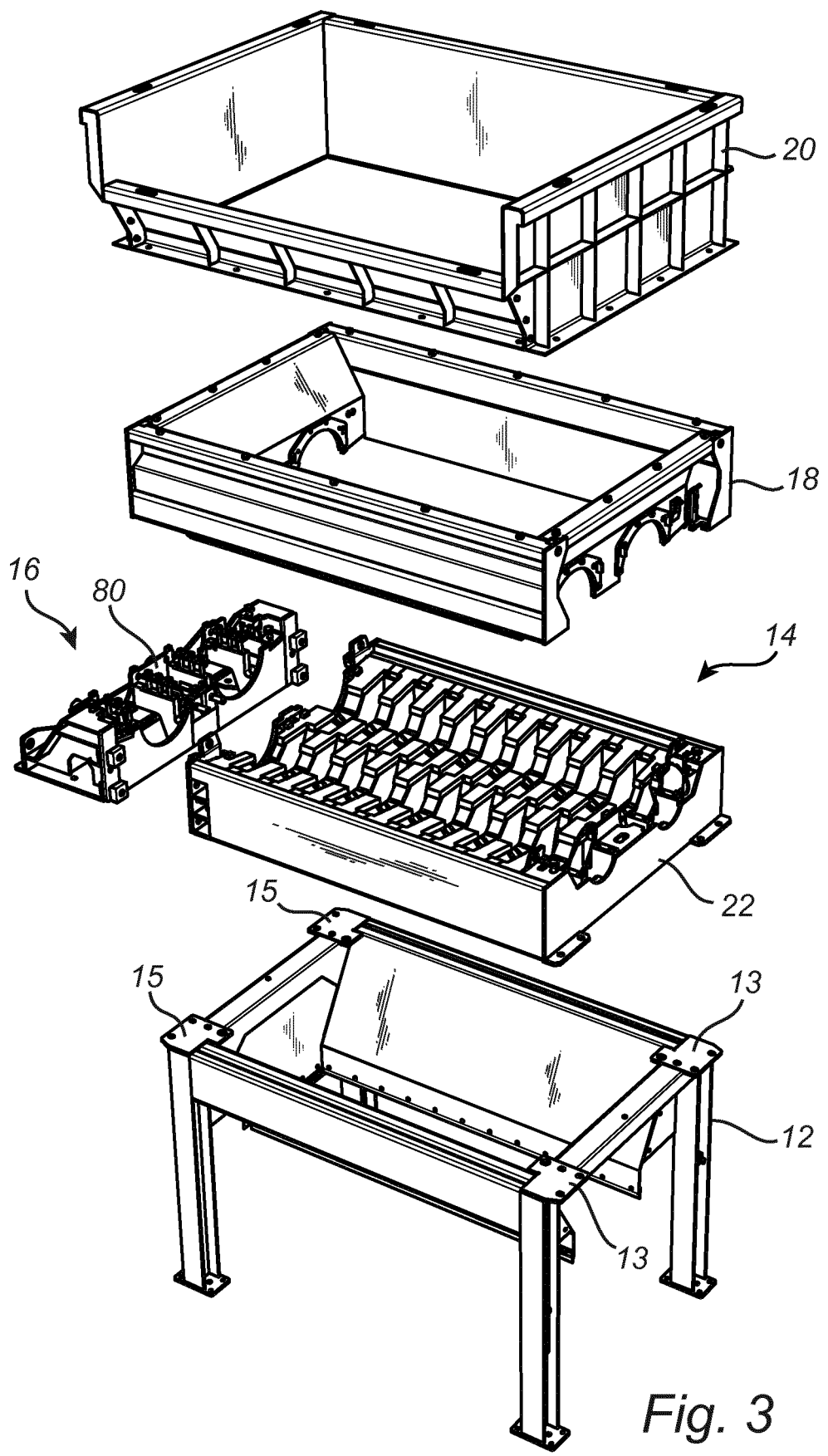
FIG. 3 illustrates individual modules of the apparatus in FIG. 1, but with cutting shafts being removed.

As illustrated in FIG. 3, the cutting module 14 (shown without its cutting shafts), the drive module 16 and the top module 18 are designed and structured as modular units which may be securely connected to each other and disconnected from each other as modules or units during assembly, disassembly and service. The top module 18 is detachably connected to the cutting module 14 at a substantially horizontal interface (at interface plane P1 in FIGS. 4b and 9b) and preferably also to the drive module 16, such that the top module 18 may be removed as a separate unit from the apparatus in order to access the cutting module 14 and the drive module 16. Access to the cutting module 14 and/or to the drive module 16 may be required in order to replace the cutting module 14, in its entirety or in part, but also in order to perform service on the cutting module 14 and/or to the drive module. In the latter case, the cutting module 14 and the drive module 16 may remain attached to the chassis 12. When the cutting module 14 is to be replaced, in its entirety or in part, the cutting module 14 may be detached from the apparatus and replaced with a new cutting module.

Figure 10A:
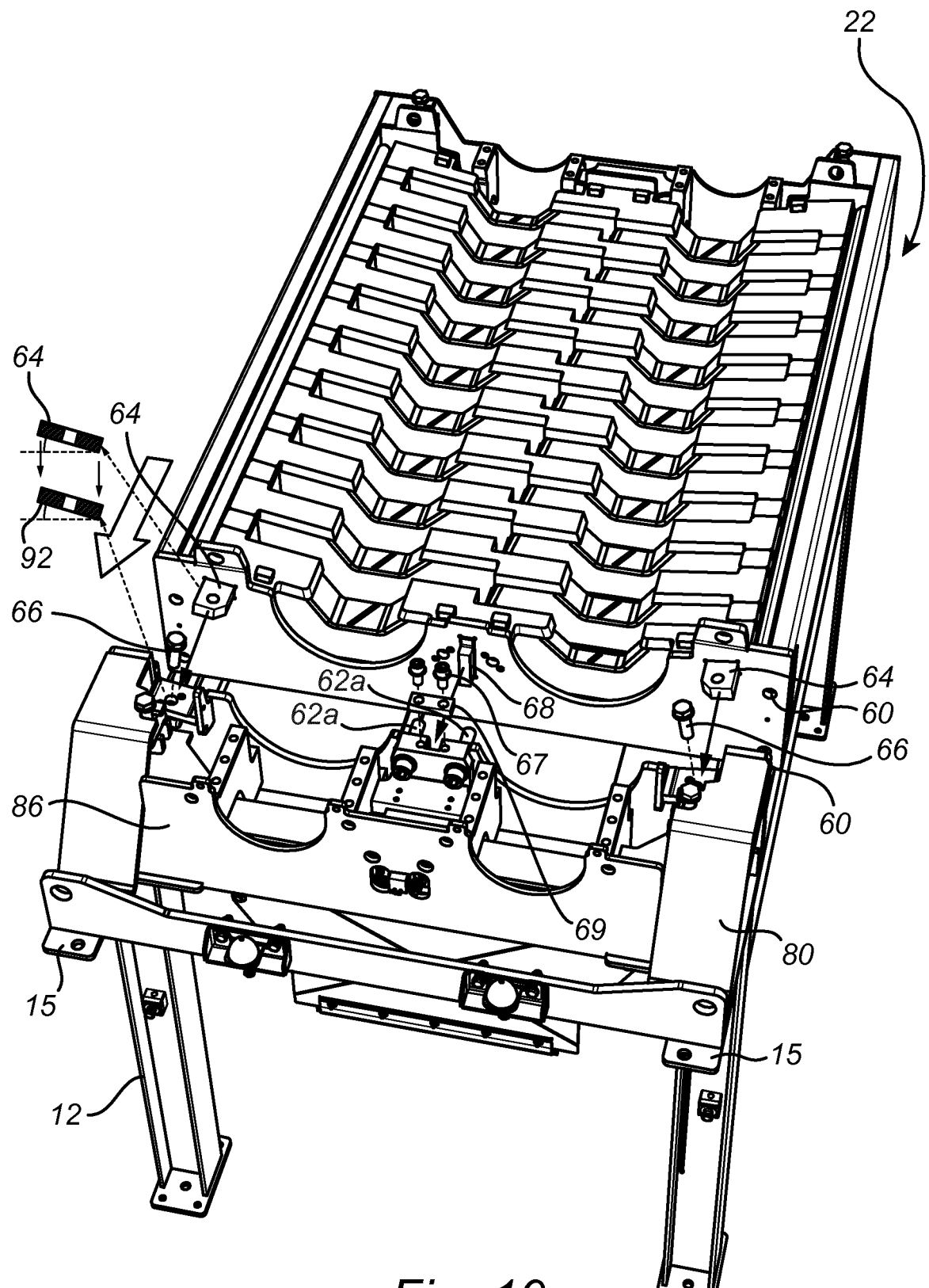

The cutting module 14 is in direct contact with and is detachably interconnected with the drive module 16 at a substantially vertical interface (at interface plane P2 in FIG. 10b), such that a worn-out cutting module 14 may be removed and replaced in its entirety or in part without any need for disconnecting or replacing the top module 18 or the drive module 16 and, especially, without requiring removal of the drive module 16 from the chassis 12 and without disconnecting the drive units of the drive module 16 from an external power source.

The modularity primarily relates to the above-described possibility of removing and replacing individual parts of the apparatus 10. Another aspect of the modularity relates to an advantage of using the same or different modules for different apparatus set-ups. For instance, a first drive module design may be used for different apparatus designs having different cutting module designs.

Each one of the cutting module 14, the drive module 16 and the top module 18 will now be described in more detail.

Figure 4A:
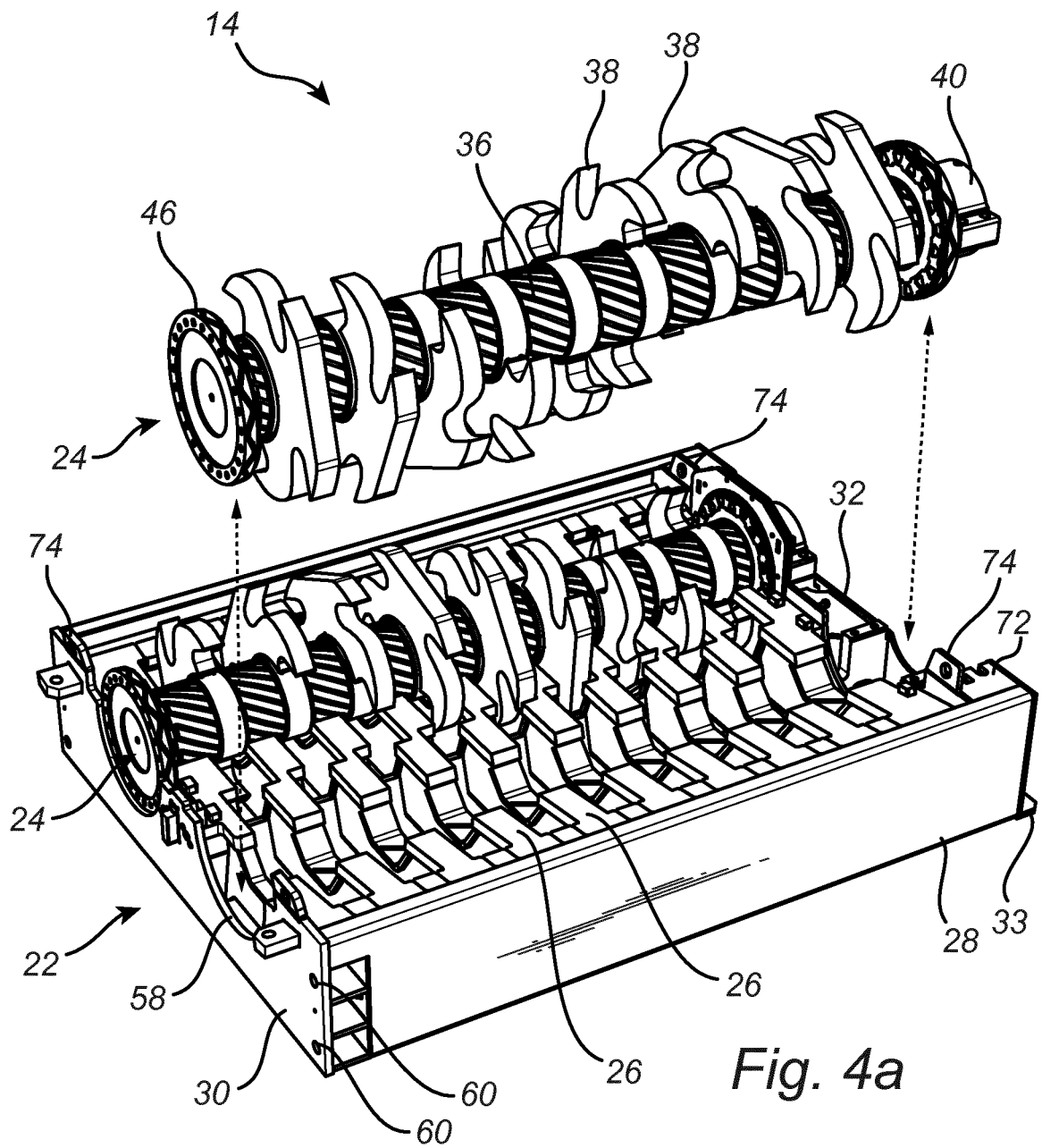
FIGS. 4a and 4b show a cutting module.
Figure 4B:
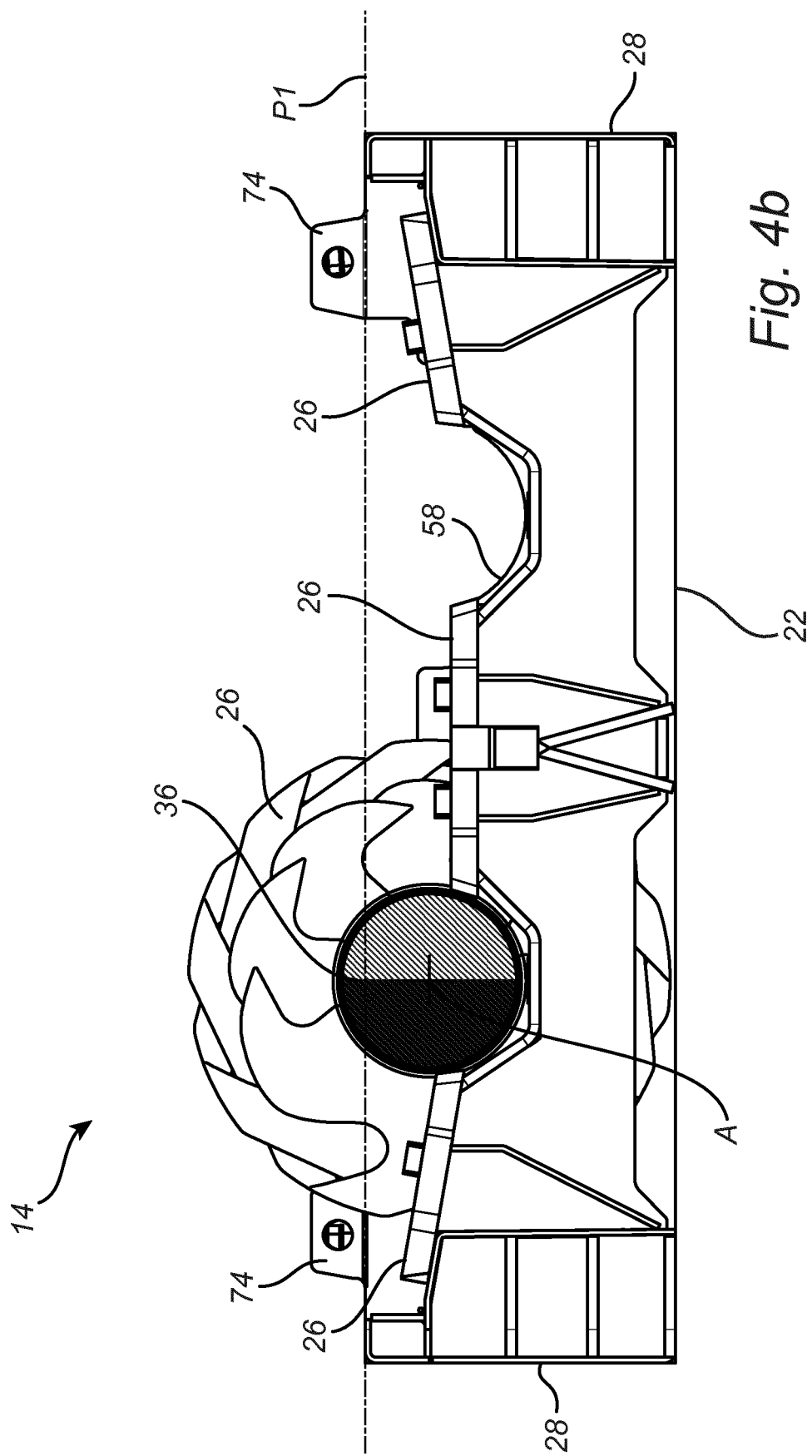
Figure 4C:
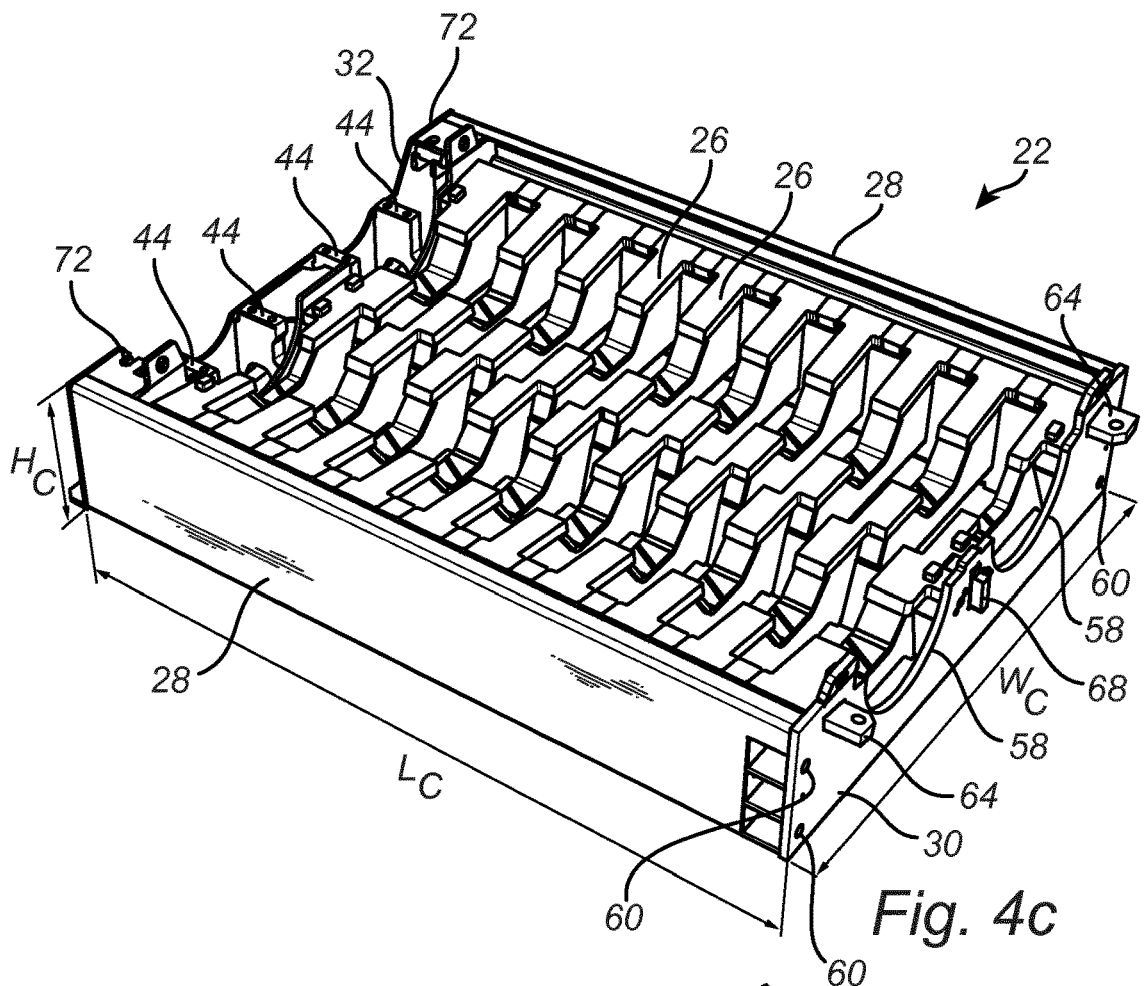
Figure 4D:
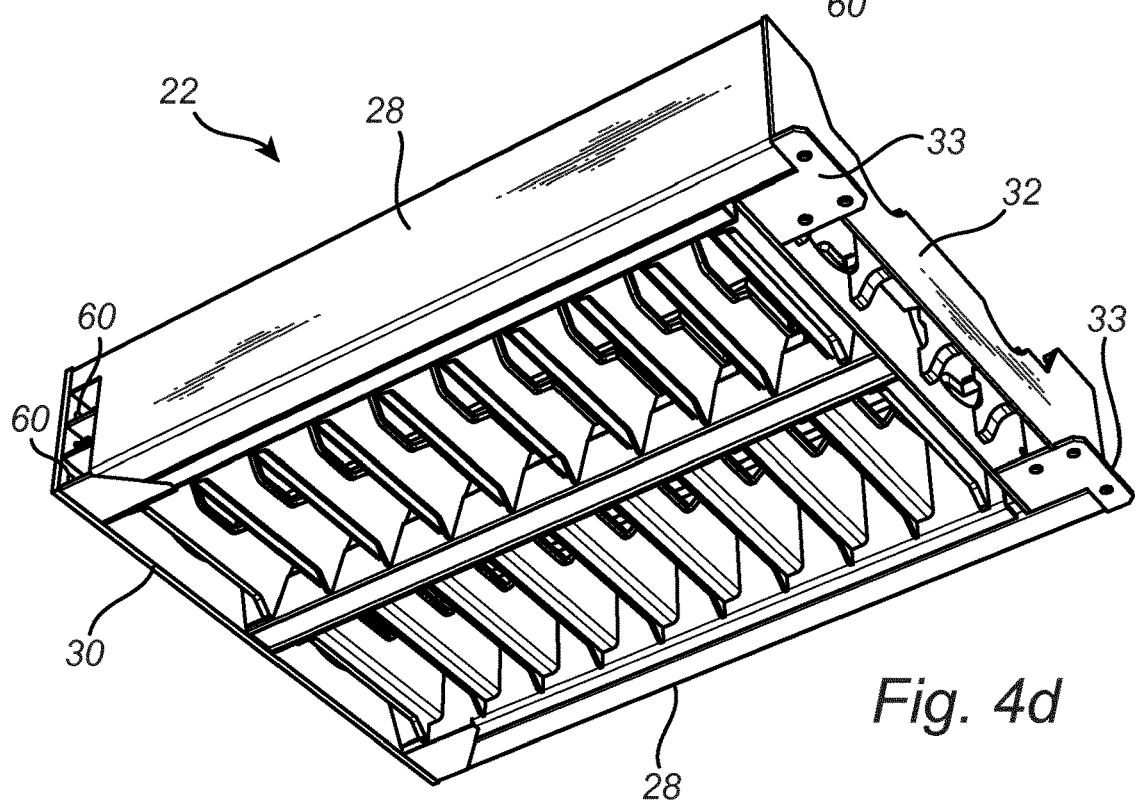
Figures 4E, 4F, 4G:
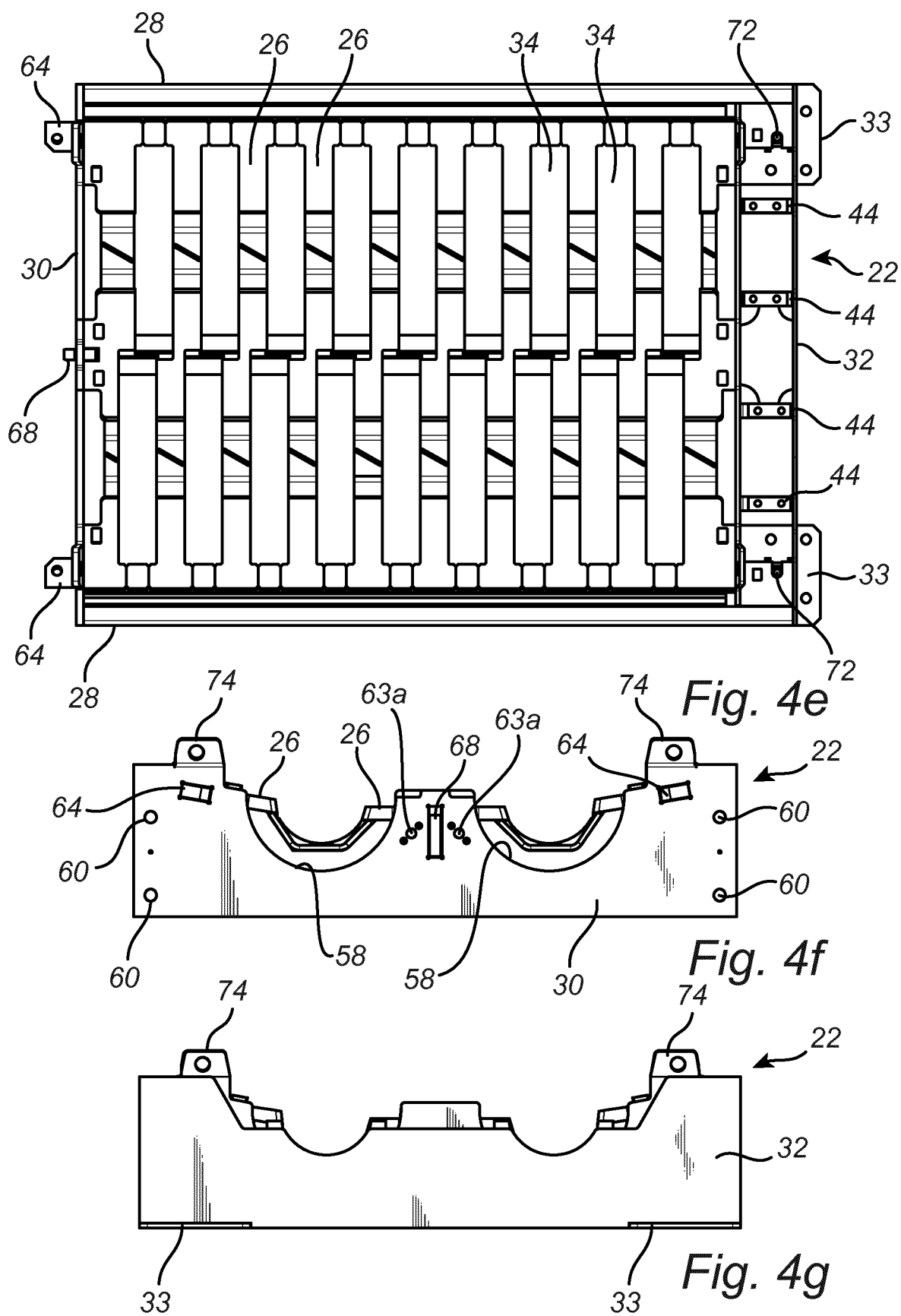

FIGS. 4a and 4b illustrate an embodiment of the cutting module 14 comprising a stationary cutting table unit 22 and two rotatable cutting shafts 24 extending in parallel in an axial direction on the top side of the cutting table unit 22. The term "cutting module" thus encompasses the stationary cutting table unit 22 as well as the rotatable cutting shafts 24. The cutting module 14 may also be designed with a different number of cutting shafts, for example with one cutting shaft only and with one set of counter knives only, or with three cutting shafts and three sets of counter knives.

The cutting module 14 represents the main wear part of the apparatus 10. The life time of a cutting module 14 may, as a non-limiting example, be about 10 000 hours. When a cutting module 14 is worn out, the entire cutting module 14, or parts thereof, must be replaced. As a first example, both the cutting table unit 22 and the cutting shafts 24 are worn out and replaced during one service event. As a second example, only the cutting table 22 unit is worn out and replaced. As a third example, only one or more cutting shafts are worn out and replaced. The cutting module 14 is therefore designed such that the cutting shafts 24 may be removed from the cutting table unit 22. FIG. 4a illustrates how the cutting shafts 24 may be separately removed from and arranged on the cutting table unit 22. Especially, this is possible to perform with a pure vertical lifting movement without the need of angling the cutting shaft 24 as is the case in the prior-art.

FIGS. 4c to 4h illustrate an embodiment of the stationary cutting table unit 22 which together with the rotatable cutting shafts 24 form the detachably connected cutting module 14. The stationary cutting table unit 22 comprises a rectangular frame and two sets of fixed counter knives 26 which are integrally connected (e.g. welded) to the frame. The counter knives 26 together form a cutting table for receiving the material to be comminuted. The dimensions of the cutting table may vary substantially. Larger cutting tables may be in the order of 2*4 m and smaller cutting tables may be in the order of 1*1.5 m. The frame of the cutting module 14 is formed by two opposite side walls 28, a proximal end wall 30 facing toward the drive module 16 and an opposite distal end wall 32. The proximal end wall 30 forms an engagement side of the cutting table unit 22 for engagement with the drive module 16. The outer dimensions of the cutting module frame are defined by an outer axial length $L_C$, an outer width $W_C$ and an outer height $H_C$. As a non-limiting example, the outer axial length $L_C$ may be in the range of 1500 to 4000 mm, the outer width $W_C$ in the range of 1500 to 2500 mm, and the outer height $H_C$ in the range of 400 to 600 mm.

Each set of counter knives 26 includes a plurality of counter knives 26 which extend crosswise in relation to the cutting shafts 24 between the side walls 28 and are mutually spaced by openings 34 through the cutting table. In the illustrated embodiment, the upper surface of the cutting table is slightly inclined upward along the opposite sidewalls 28 as best seen in FIG. 4a in order to guide the waste material on the cutting table.

As illustrated in FIG. 4a, each rotatable cutting shaft 24 comprises a rotatable shaft 36 and a set of disc-shaped rotating knives 38 which are mounted on the shaft 36 at mutually spaced intervals in the axial direction. In the assembled apparatus 10, the rotating knives 38 extend partly into the openings 34 through the cutting table. During operation, the rotating knives 38 in co-operation with the fixed counter knives 26 comminute the waste material on the cutting table. The comminuted material (not shown) falls through the openings 34 in the cutting table down onto a conveyor (not shown) for removing the comminuted material from the apparatus. WO 97/10057 discloses further optional details regarding the cutting operation. In operation, the cutting shafts 24 are rotating in opposite direction, toward each other, away from each other or combinations thereof.

Each cutting shaft 36 is rotatably supported by a distal bearing 40 arranged in the cutting module 14 (see FIG. 4a) and by a proximal bearing 42 arranged in the drive module 16 (see FIG. 5a). It will be seen from FIGS. 2a and 2b that these bearings 40 and 42 are located outside the cutting or waste handling area. Especially, the distal bearings 40 are covered by the top module 18. Reference numeral 44 in FIGS. 4c and 4e indicate mounting supports for the distal bearings 40.

Figure 7:
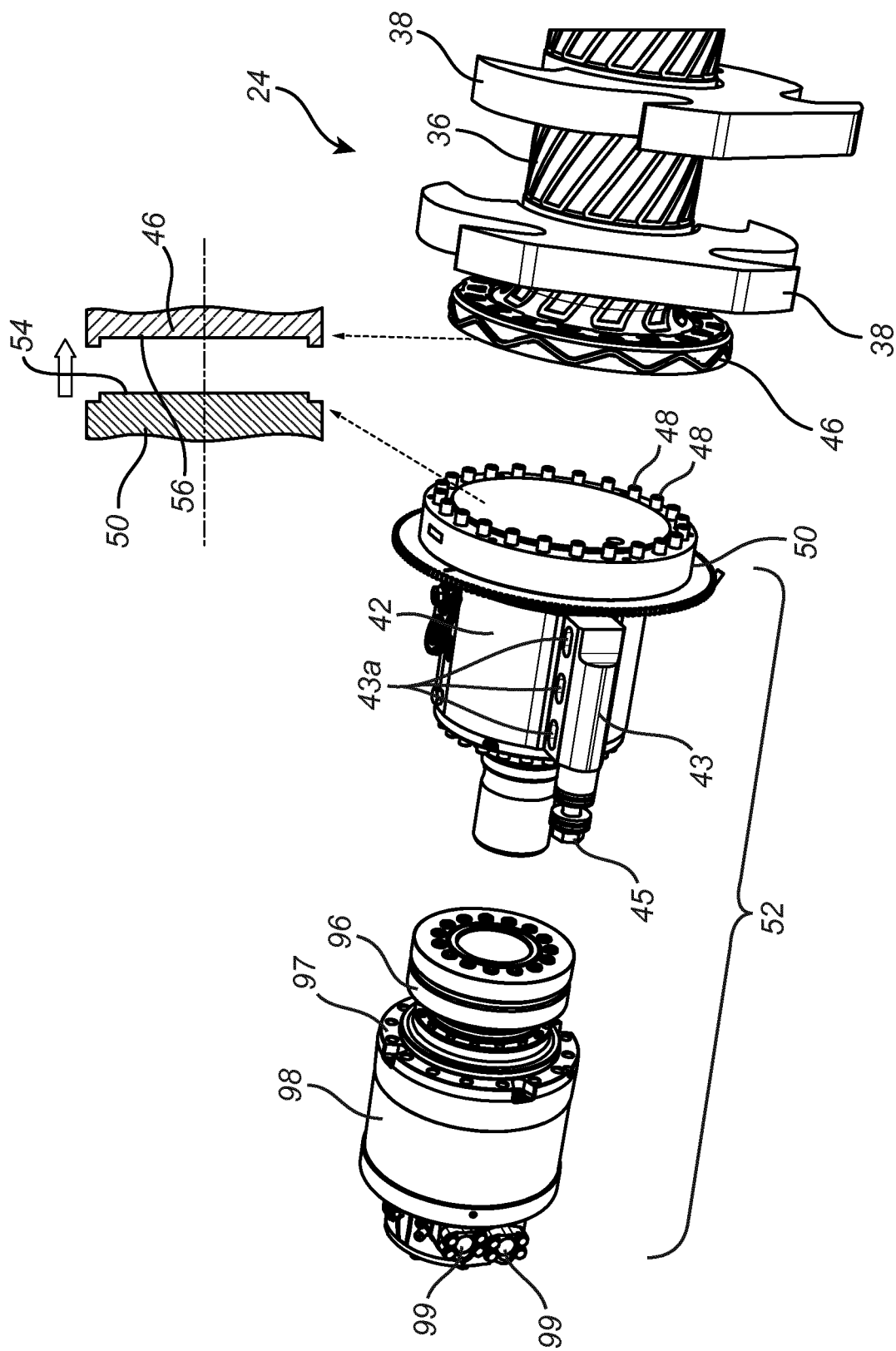
FIG. 7 is an exploded view of the drive unit.

As best illustrated in FIG. 7, in order to transfer drive force to the cutting shafts 24 from the drive module 16, and in order to ensure that the overall cutting module 14 is detachably connected to the drive module 16, each shaft 36 is provided with a coupling flange 46 which is detachably connected by bolts 48 to a corresponding coupling flange 50 of a drive unit 52 arranged in the drive module 16. As illustrated in FIG. 7, each pair of coupling flanges 46, 50 may optionally be designed with a centrally located female/male structure 54, 56 for centering the coupling flanges 46, 50.

The coupling flanges 46, 50 may preferably be axially located substantially at the proximal end wall 30 of the cutting table unit 22. Thereby, the connecting interface between the cutting table unit 22 and the drive module 16, on the one hand, and the connecting interface between the cutting shafts 24 and the drive module 16, on the other hand, will be substantially coinciding in a common vertical plane P2 (see FIG. 10b) defining the interface between the cutting module 14 and the drive module 16. For this purpose, the proximal end wall 30 of the cutting table unit 22 is provided with two semi-circular openings 58 for receiving the lower part of the coupling flanges 46, 50.

The rotational axis A of each cutting shaft 24 may positioned in the vertical direction substantially in level with the top of the cutting table unit 22. As mentioned above, the design is such that the cutting shafts 24 may be lifted off from the cutting table unit 22. In the illustrated embodiment and as best shown in FIG. 4b, the rotational axis A is located slightly under the horizontal interface plane P1 between the cutting module 14 and the top module 18.

According to the inventive concept, the cutting module 14 as a whole is detachably connected to the drive module 16. As described above, the cutting shafts 24 are detachably connected to the drive module 15 by means of the coupling flanges 46, 50 and the bolts 48. The stationary cutting table unit 22 is also detachably connected to the drive module 16, as will be described in detail below.

During operation, very strong forces acting in different directions will be present in the interface P2 between the cutting table unit 22 and the drive module 16. The interface between the drive module 16 and the cutting module 14 is therefore subjected to substantially stronger forces than the interface with the top module. Specifically, such forces include axial forces, radial forces (essentially vertical forces) and transverse forces, which forces may tend to move the cutting module 14 and the drive module 16 apart from each other in the axial direction, in the vertical direction and in the transverse direction, respectively. In the illustrated embodiment, the direct and detachable connection between engagement sides of the cutting table unit 22 and the drive module 16 is structured and designed to handle and transfer such strong forces such that the operation of the apparatus 10 is not compromised due to the modular design of the apparatus. For this purpose, the stationary cutting table unit 22 may be provided with specially designed and specially positioned connector parts.

In the preferred embodiment, the direct and detachable connection between the cutting table unit 22 and the drive module 16 is preferably designed such that:
the connection is not damaged by the waste material or by the impact forces;
the connection does not interfere with the waste material area;
the connection is able to transfer the above-mentioned different forces substantially separately from each other; and
the connection may be easily accessed during service.

In the illustrated embodiment, the dedicated connector parts of the cutting table unit 22 are arranged at the proximal end wall 30 in order to be easily accessed during service.

First, the proximal end wall 30 has two pairs of axially directed bolt openings 60 which are formed adjacent to the side walls 28 and which are arranged to receive axial bolts 62 for transferring mainly axial forces. Second, the proximal end wall 30 has two connector tabs 64 which project toward the drive module 16 and which are provided with bolt openings arranged to receive substantially vertical bolts 66 (FIG. 5a) for transferring mainly radial/vertical forces. These connector tabs 64 are preferably located close to the shafts 36 in the transverse direction. In the illustrated embodiment, the connector tabs 64 are slightly angled. Third, the proximal end wall 30 has a centrally located connector tab 68 which projects toward the drive module 16 and is arranged to be received in a matching vertical groove 70 (FIG. 5b) of the drive module 16 for preventing lateral displacement between the cutting module 14 and the drive module 16. In this manner, the differently directed forces acting in the P2 interface may be handled/transferred at corresponding different connectors/positions. Thereby, added tolerances may be avoided and each connection may be optimized for the corresponding force direction.

In the illustrated embodiment, the P2 interface is provided with additional connectors to provide additional strength at the center region in the axial direction and in the vertical direction. Two additional axial connector bolts 62a, one at each side of the vertical groove 70, are arranged to be received in corresponding bolt openings 63a in the cutting table unit 22 in order to increase the strength of the P2 interface in the axial direction by engaging nuts in the cutting module (not shown). Furthermore, the height of the central connector tab 68 matches the height of the vertical groove 70 such that the vertical position of the central connector tab 68 within the groove 70 may be fixed with a bracket 69 and two vertical bolts 67 as illustrated in FIG. 5b, thereby increasing the strength of the P2 interface in the vertical direction also.

In alternative embodiments, the connector bolts 62a may be dispensed with. The central connection 68/70 may be structured to take up transverse forces only. In such embodiments, both vertical ends of the recess 70 may be open. In some embodiments, the recess 70 may have an open top but a closed bottom taking up downward forces but not upward forces from the cutting module.

At its distal end wall 32, the cutting table unit 22 is provided with two mounting flanges 33 for detachably connecting the distal end of the cutting table 22 to the chassis 12 at reference numeral 13 in FIG. 3 by bolts (not shown). Reference numeral 72 designates areas for detachably connecting the distal end of the cutting table unit 22 to the top module 18 by bolts (not shown). Reference numeral 74 designate lifting tabs for lifting the cutting module 14 during assembly and disassembly. In the illustrated embodiment, the lifting tabs 74 may also assist during assembly in guiding the top module 18 into a correct position in relation to the cutting module 14. To this end, the lifting tabs 74 may be angled.

Figure 5B:
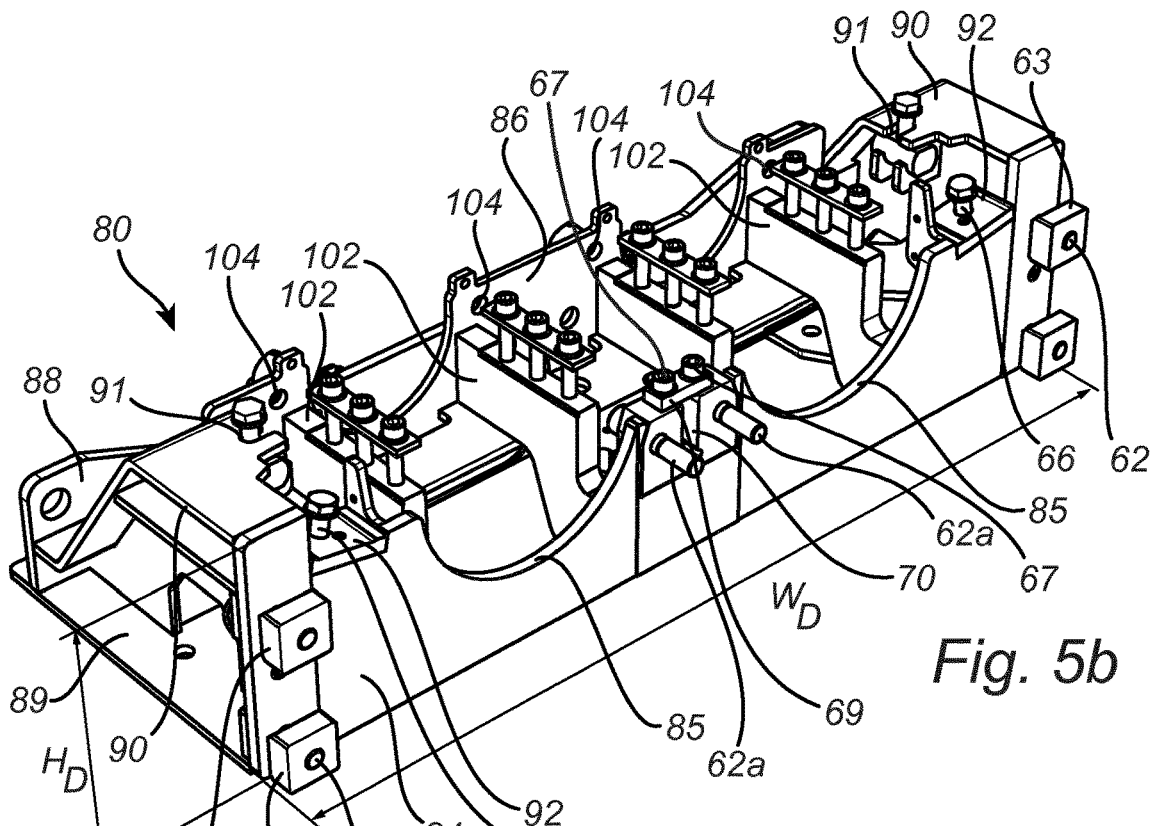
FIGS. 5b and 5c show a body of the drive module.
Figure 5C:
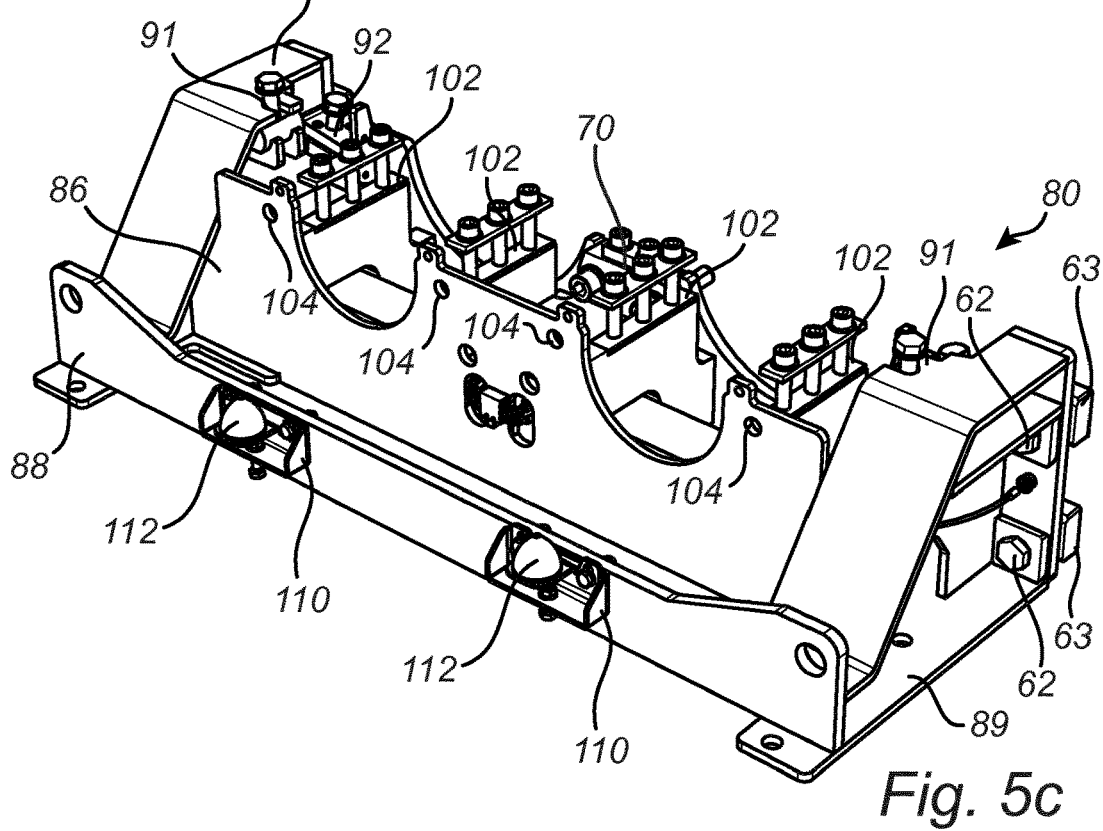
Figure 6:
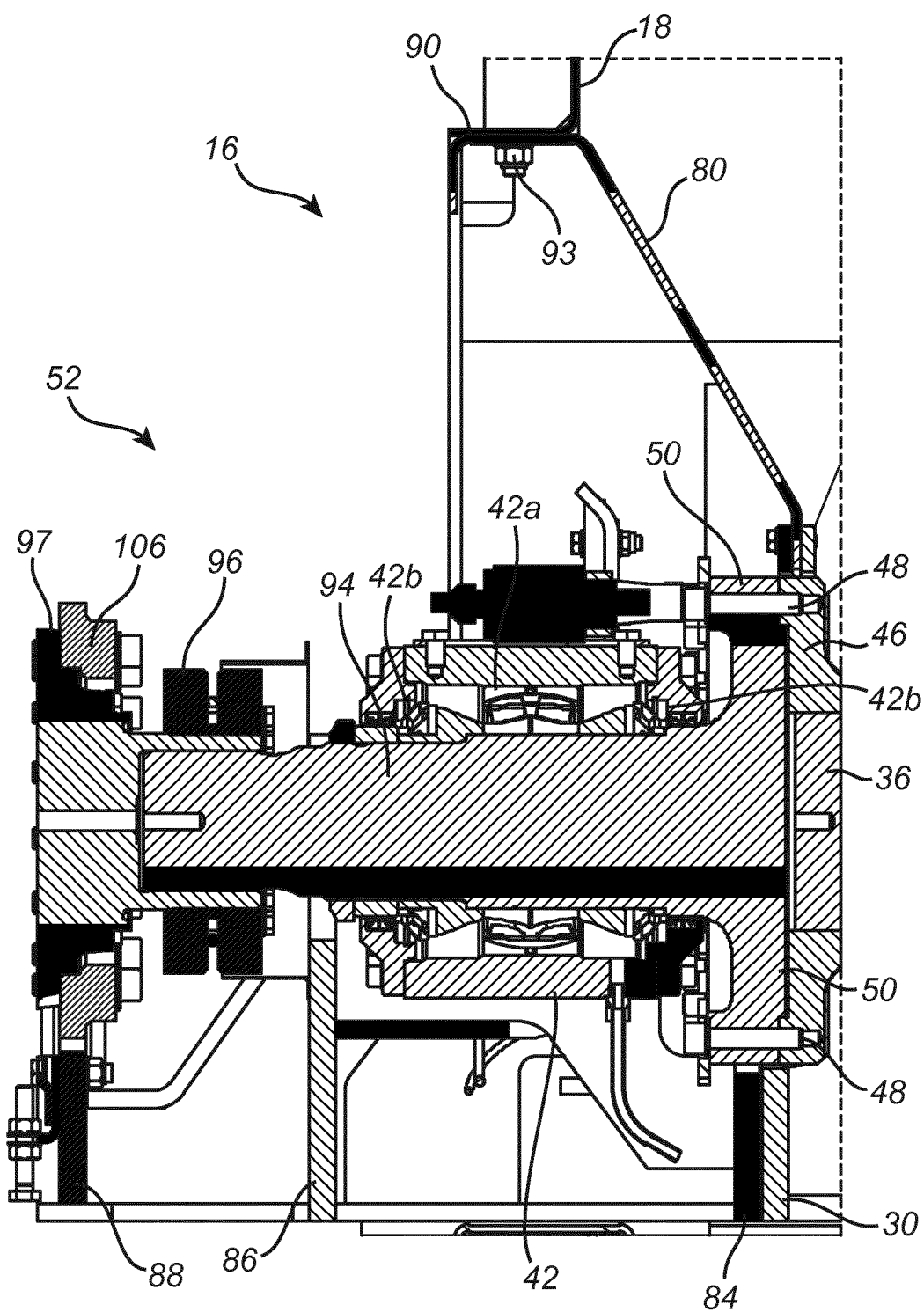
FIG. 6 is an axial cross section of a drive unit.

FIGS. 5a to 5c show the drive module 16 in greater detail. In the assembled apparatus, the drive module 16 is detachably connected to the chassis 12 at reference numeral 15 in FIG. 3 with bolts (not shown). The drive module 16 comprises a drive module body 80 and two drive units 52 for the cutting shafts 24. In single-shaft embodiments, the drive module 16 would include one drive unit 52 only.

The drive module body 80 has to its purpose to support the drive units 52 and to connect the drive module 16 directly and detachably to the cutting table unit 22 at the interface P2 such that the above-mentioned strong forces may be handled. The body 80 comprises a first vertical wall 84, termed engagement wall or engagement side, for engaging the proximal end wall 30 of the cutting module 14, a second vertical wall 86, termed intermediary wall, and a third vertical wall 88, termed rear wall. The walls 84, 86, 88 are connected to a pair of bottom plates 89 of the body 80. In the assembled apparatus 10, the engagement wall 84 of the body 80 is directly and detachably connected to the proximal end wall 30 of the cutting table unit 22 by means of the above-mentioned connector parts.

First, the engagement wall 84 of the drive module body 80 has two pairs of axially directed bolt openings which are aligned with the bolt openings 60 in the cutting table unit 22. Thereby, the cutting module 14 and the drive module 16 may be interconnected securely but still detachably in the axial direction by the axial bolts 62 and associated nuts 63 (FIG. 5a). This direct and detachable connection is designed to take up axial forces mainly.

Second, the engagement wall 84 of the body 80 is provided with two connector tabs 92 (FIG. 5b) which extend rearward from the engagement wall 84 at positions corresponding to the connector tabs 64 of the cutting table unit 22, such that the connector tabs 64 may extend over in aligned relationship with the connector tabs 92. Thereby, the cutting module 14 and the drive module 16 may be interconnected securely but still detachably in the vertical direction by substantially vertical bolts 66 (FIG. 5a) and corresponding nuts. This direct and detachable connection is designed to take up radial/vertical forces mainly.

Third, the engagement wall 84 is provided with the above-mentioned vertical central groove 70 which is arranged to receive the central connector tab 68 of the cutting table unit 22. The lateral engagement between the central connector tab 68 and the vertical groove 70 ensures that the cutting module 14 and the drive module 16 may be interconnected securely but still detachably in the transverse direction. This detachable connection is designed to take up transverse forces mainly.

The body 80 of the drive module 16 further comprises horizontal top walls 90 with bolt openings 91 for supporting the top module 18 and for detachably connecting the drive module 16 to the top module 18 by bolts 93.

The drive units 52 of the drive module 18 and their connections to the drive module body 80 and the cutting shafts 24 will now be described in more detail with reference to FIGS. 5a to 5c, 6 and 7. As best illustrated in FIG. 7, each drive unit 52 comprises, going from right to left in the figure, a coupling flange 50 for releasable connection with a shaft flange 46, a drive shaft 94 integrally formed with the coupling flange 50, a proximal bearing 42 including a radial bearing 42a and axial bearings 42 (see FIG. 6), a shrink disk 96, a coupling flange 97, and a hydraulic motor 98 connected to the coupling flange 97. Each hydraulic motor 98 is connected, at hydraulic fittings 99, to hydraulic hoses (not shown) for receiving operational hydraulic power from an external power source (not shown). Other embodiments may comprise electric motors.

The drive units 52 are securely connected to the body 80 in order to ensure that the strong forces mentioned above may be handled also within the driving module 18. The axial forces and the radial forces are handled by different connections at different positions, essentially according to the same principle as used in the interface P2 between the cutting module 14 and the drive module 16.

As best seen in FIGS. 5a and 7, each proximal bearing 42 is provided with a pair or horizontally extending mounting parts 43. Each mounting part 43 has a number of vertical bolt openings 43a for receiving vertical bolts 43b and a rear axial bolt opening for receiving an axial bolt 45. Each mounting part 43 is positioned and supported on an associated mounting support 102 integrally formed with the body 80 (FIG. 5b). The vertical bolts 43b engage the mounting supports 102 in order to securely connect the drive units 52 to the body 80 in order to take up radial/vertical forces mainly. The axial bolts 45 pass through openings 104 in the intermediary wall 86 in order to securely connect the drive units 52 to the body 80 in the axial direction for taking up axial forces mainly.

In order to prevent the drive units 52 from rotating in relation to the body 80 during operation, each motor 98 may be rotationally fixed by a torque arm 106 (FIG. 5a) which via a connector 108 is securely attached to the rear wall 88 of the body 80.

As shown in FIG. 5c, two brackets 110 may be arranged on the rear wall 88 of the body 80. A supporting rubber element 112 is attached to each bracket 110 and may be adjusted in the vertical direction. The rubber elements 112 are arranged to vertically support the motors 98. Especially, they prevent the motors 98 from being angled off-axis when the coupling flanges 46, 50 are disconnected from each other. Without the support from the elements 112, the radial bearing 42a could allow the motors 98 to tilt downwardly from their proper axial position. The optional supporting elements 112 may thus simplify the operation of replacing a cutting module 14 further since the drive module 16 and the drive units 52 thereof will be unaffected by the removal of the cutting module 14. In other embodiments, the brackets 110 and the rubber elements 112 may be dispensed with.

The design of the illustrated embodiment has the advantage that substantially all strong forces acting during the cutting operation are handled in level with the cutting module 14 and the drive module 16. Essentially none of the very strong forces will act on the interface P1 with the top module 18. Also the torque arms 106 are completely arranged in level with the drive module 16. This design allows for easy detachment of the top module 18 and reduces the required strength of the top module and its connections to the cutting module 14 and the drive module 16.

The design of the illustrated embodiment has also the advantage that essentially all the strong forces which has to be transferred between the cutting module and the drive module during operation are transferred at the interface P2 between the modules by the direct and detachable interconnection of the engagement sides of the cutting module and the drive module.

Figure 8A:
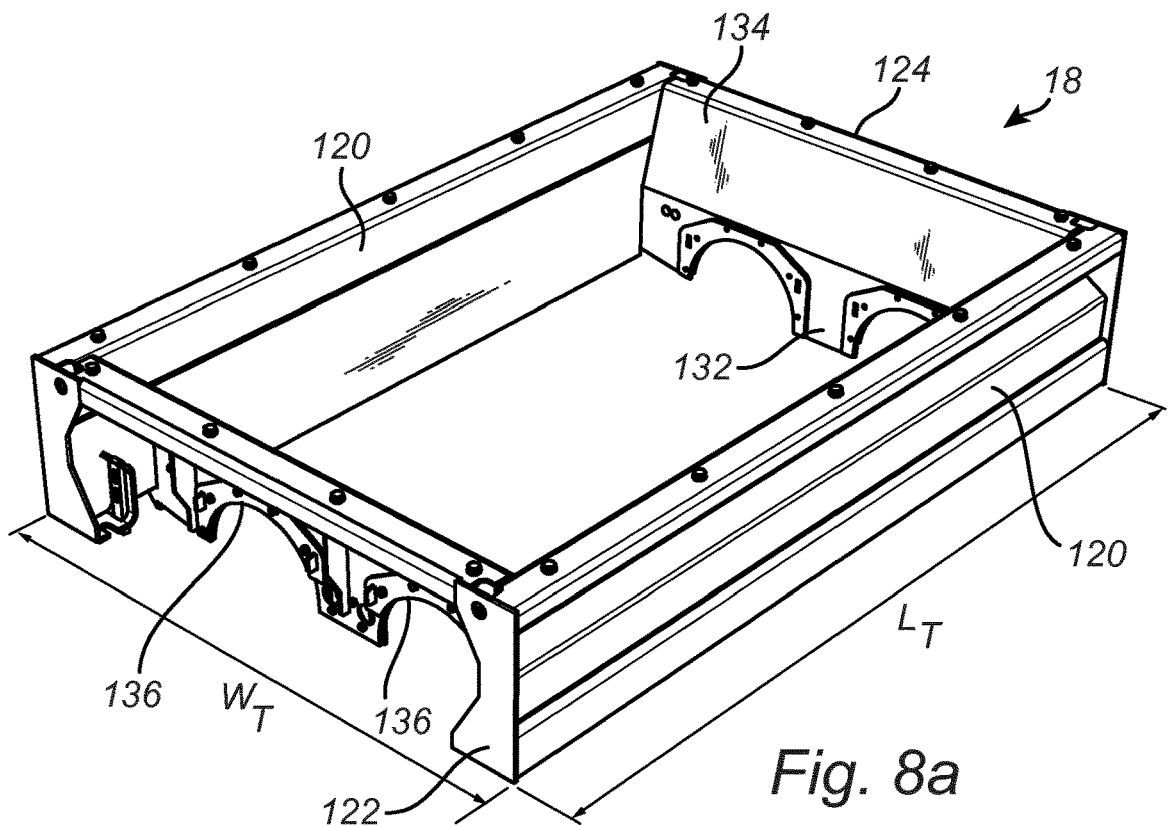
FIGS. 8a and 8b show a top module.
Figure 8B:
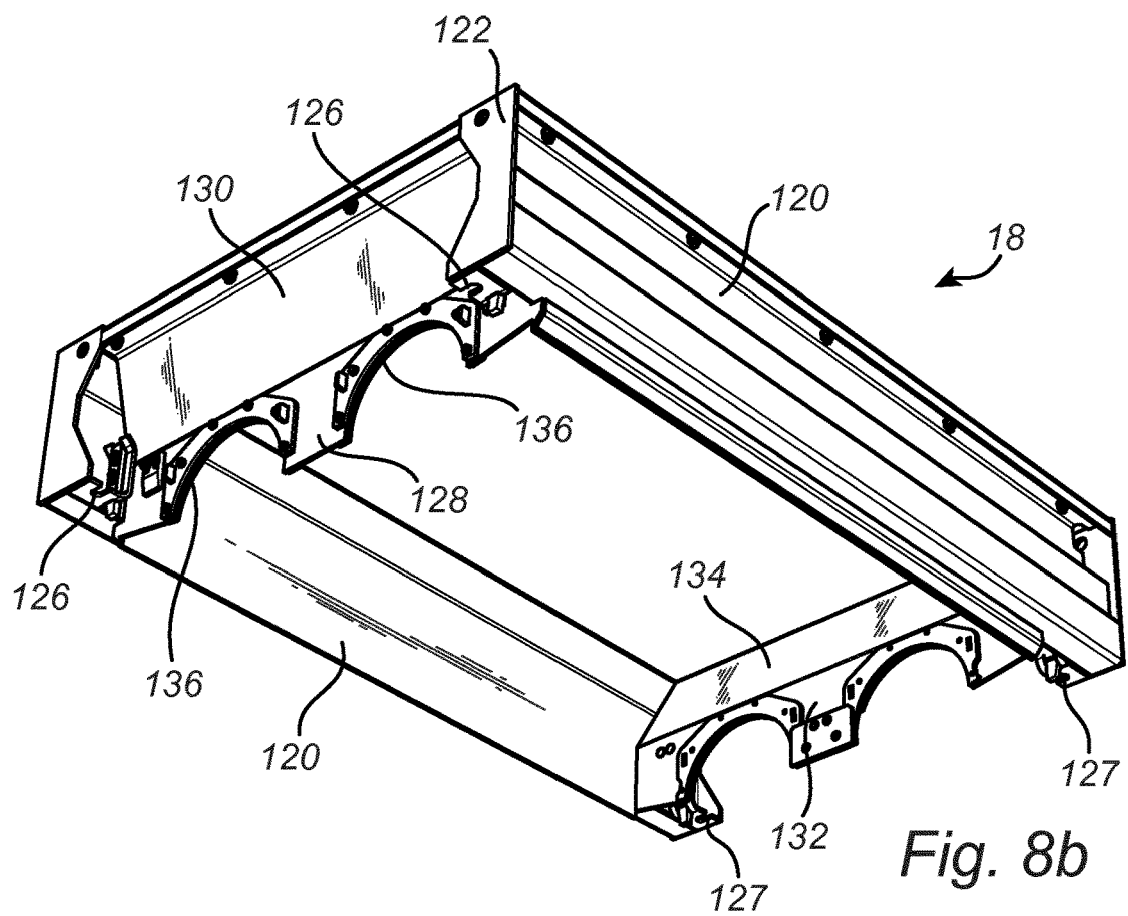

The top module 18 shown in FIGS. 8a and 8b is configured as rectangular frame comprising a pair of substantially vertical side walls 120, a proximal end 122 and a distal end 124. The inside of the frame defines a cutting area above the cutting table of the cutting module 14. The outer horizontal dimensions of the top module 18 are defined by an outer length $L_T$ and an outer width $W_T$. In the assembled apparatus, the top module 18 is in direct engagement with and is preferably detachably connected by bolts to the bottom of the hopper 20 having corresponding horizontal dimensions.

Figure 9A:
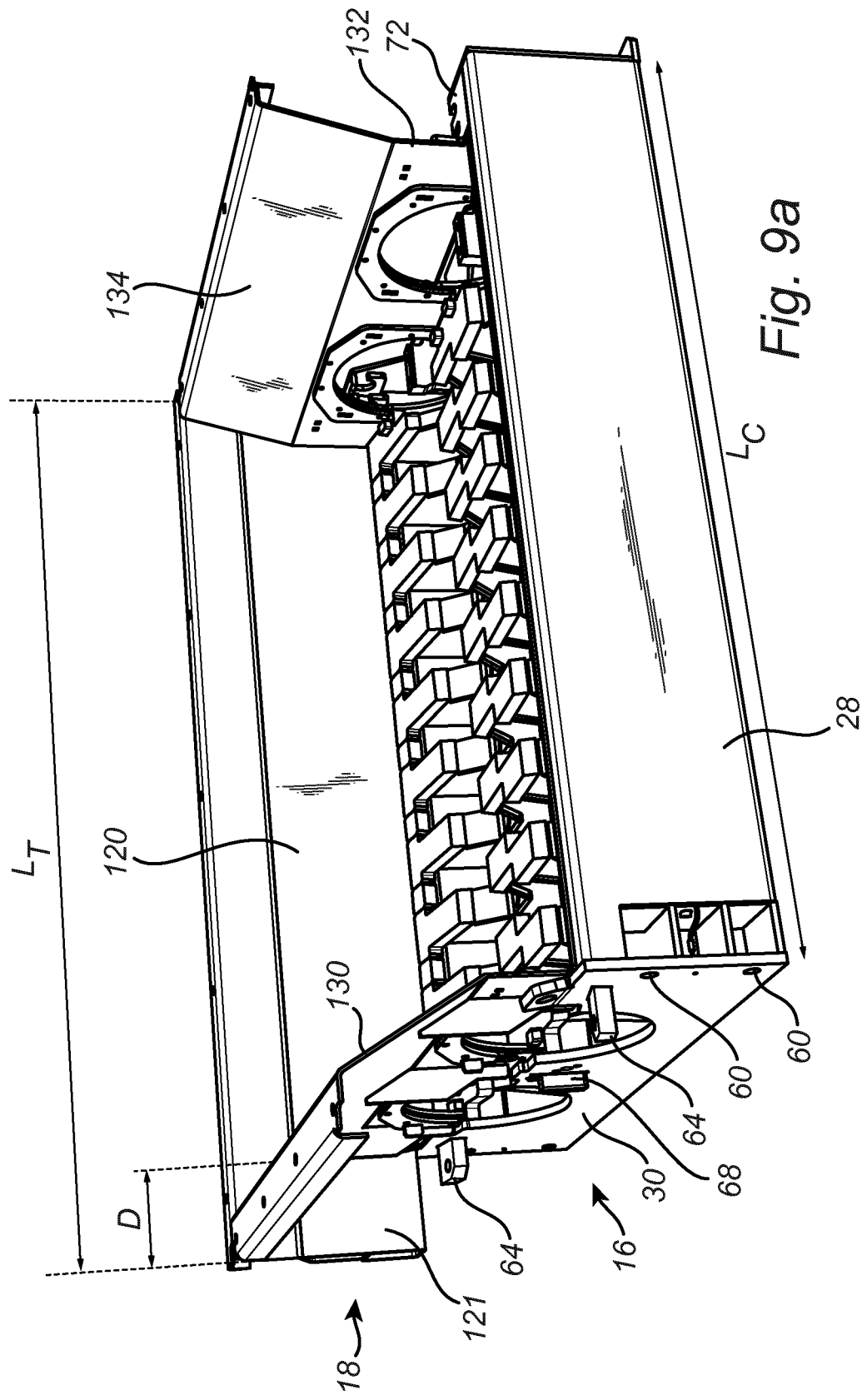
FIGS. 9a and 9b illustrate the top module mounted on the cutting table unit.

As shown in FIG. 9a, the outer length $L_T$ of the top module 18 is larger than the outer length $L_C$ of the cutting module 14 such that the side walls 120 of the top module 18 presents a horizontal extension 121 extending by a distance D above the drive module 16 (FIG. 2a). The extension 121 is provided with connection areas 126 (FIG. 8b) for detachably connecting the proximal end 122 of the top module 18 to the drive module 16 at reference numeral 91 in FIG. 5c. The distal end 124 of the top module 18 is provided with corresponding connection areas 127 for detachably connecting the distal end 124 of the top module 18 to the cutting module 14 at reference numeral 72 FIGS. 4c and 9a. In the illustrated embodiment, there are no further vertical connections between the top module 18, on the one hand, and the cutting module 14 and the drive module, on the other hand.

The proximal end 122 of the top module 118 is formed by a substantially vertical lower end wall 128 and an outwardly angled upper end wall 130. The distal end 124 of the top module 118 is formed by a substantially vertical lower end wall 132 and an outwardly angled upper end wall 134. The axial distance between the lower end walls 128, 132 of the top module 18 is less than the outer axial length $L_T$ of the top module 18, such that the inner horizontal dimensions of the top module 18 correspond to the horizontal dimensions of the cutting table of the cutting module 14 as illustrated in the top view in FIG. 2b and in the perspective view in FIG. 9a.

The proximal lower end wall 128 of the top module 18 comprises a pair of semi-circular openings 136 which in the assembled apparatus 10 are positioned above and aligned with the corresponding semi-circular openings 58 in the cutting module 14. The openings 58 and 136 together form flange openings for receiving the coupling flanges 46, 50. By positioning the coupling flanges 46, 50 axially at the interface P2 between the cutting module 14 and the drive module 16 the advantage is obtained that the removal of the cutting module 18 is facilitated since the coupling flanges 46, 50 are easily accessed. Furthermore, this design will provide a "seal" which effectively prevents waste material in the cutting area from entering into the drive module 16. Any waste material has to "climb" over the coupling flanges 46, 50 at said flange openings.

Figure 9B:
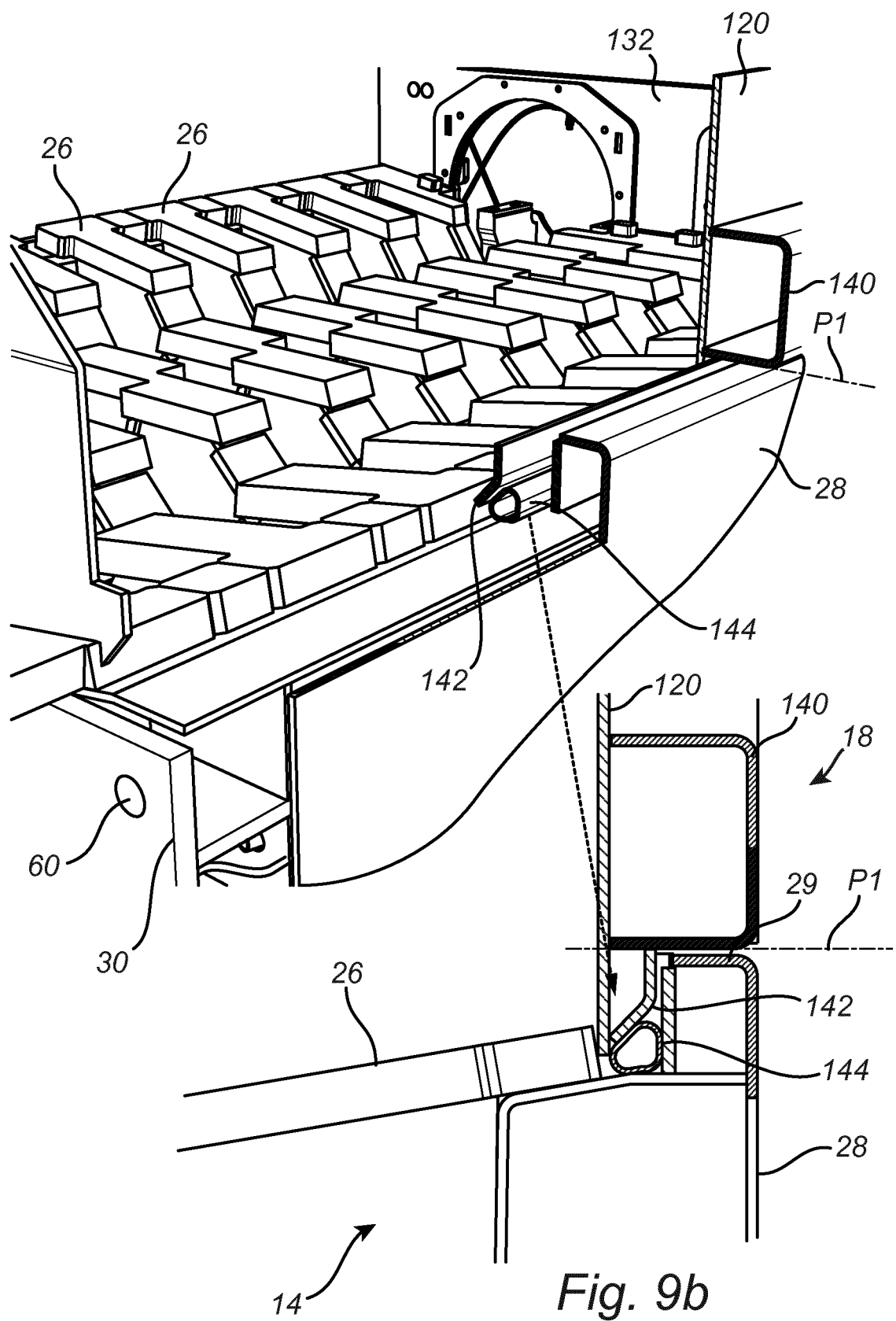

Reference is now made to FIG. 9b, illustrating in greater detail the interface at the interface plane P1 between the top module 18 and the cutting module 16 along the side walls 28, 120. The side walls 120 of the top module 18 are provided with axially extending outer support profiles 140 which as shown in FIG. 9b are vertically supported by inwardly bent support flanges 29 of the side walls 28 of the cutting module 14. The side wall 120 extends vertically beyond the support profile 140 and beyond the interface plane P1 to a position adjacent the fixed counter knives 26. An angled profile 142 and a sealing profile 144 as shown in FIG. 9b form together with the lower extension of the side wall 120 a labyrinth seal preventing waste material from entering into the interface between the top module 18 and the cutting module 16. The angled profile 142 also assists in positioning the top module 18 in relation to the cutting module 16 during assembly. In the assembled state, this connection also ensures that the top module 18 is held in correct position in the transverse direction in relation to the cutting module 14.

Reference is now made to FIGS. 11a to 11d and FIGS. 12a to 12d, illustrating method steps included in one embodiment of a method according to the inventive concept for replacing/substituting wear parts of an apparatus 10 of the kind described above.

FIG. 11a illustrates the assembled apparatus. In the illustrated case, it may be assumed that both the fixed counter knives 36 of the cutting table unit 22 and the rotating knives 38 of the cutting shafts 24 are worn out and have to be replaced. In such a situation, the cutting module 16 will be replaced in its entirety with a new cutting module.

FIG. 11b illustrates a first step in which the top module 18 have been disconnected from the cutting module 16 at its distal end and disconnected from the drive module at its proximal end, and thereafter lifted up (arrow A1) from the cutting module 14 and the drive module 16 together with the hopper 20. The top module 18 and the hopper 20 may be temporarily positioned on the floor next to the apparatus. Obviously, the hopper 20 may be lifted away separately also. The cutting module 14 and the drive module 16 are now completely accessible.

FIG. 11c illustrates a second step in which the cutting module 16 has been disconnected from the drive module 16. The drive module 16 may advantageously remain connected to the chassis 12, and the drive units 52 may advantageously remain connected to the hydraulic hoses. It may also be noted that the torque arms 106 do not have to be disconnected since they their distal ends are connected within the drive module 16.

Disconnecting the drive module 16 involves disconnecting the coupling flanges 46, 50 from each other, and disconnecting the cutting table unit 22 from the body 80 of the drive module 16. All connections are located at the drive end of the apparatus, which is the area where the staff most often has the best access to the apparatus during service.

In the present embodiment, the cutting module 14 is initially moved horizontally away from the drive module 16 by a sliding movement (arrow A2) along the top of the chassis 12. This may be needed in case the connection at the vertical interface P2 requires such an initial horizontal movement, for instance due to the female/male structure 54, 56 illustrated in FIG. 7 or due to the specific design of the connectors in the interface P2. In other embodiments, such an initial horizontal movement may be dispensed with.

FIG. 11d illustrates the next step where the complete cutting module 16 may be lifted up (arrow A3) and away from the chassis 12 by lifting straps or the like connected to the lifting tabs 74 of the cutting table unit 22.

Figure 12A:
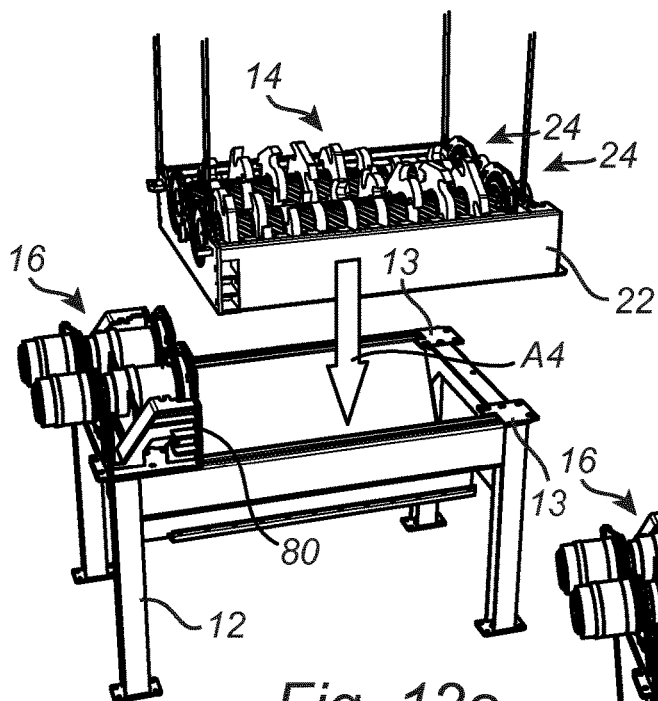
Figure 12B:
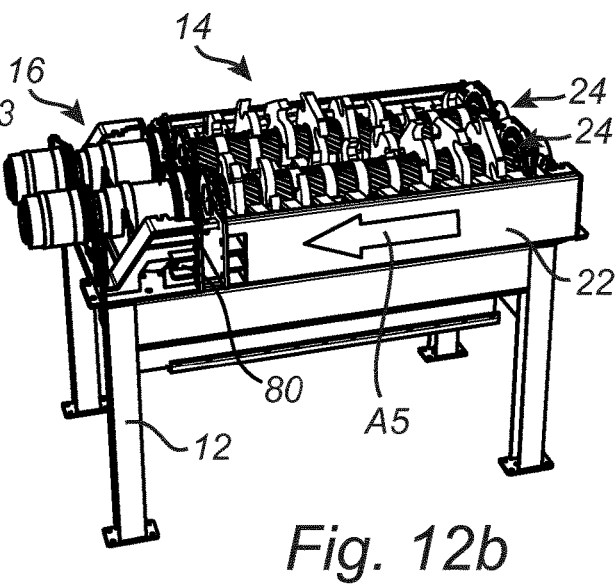
Figure 12C:
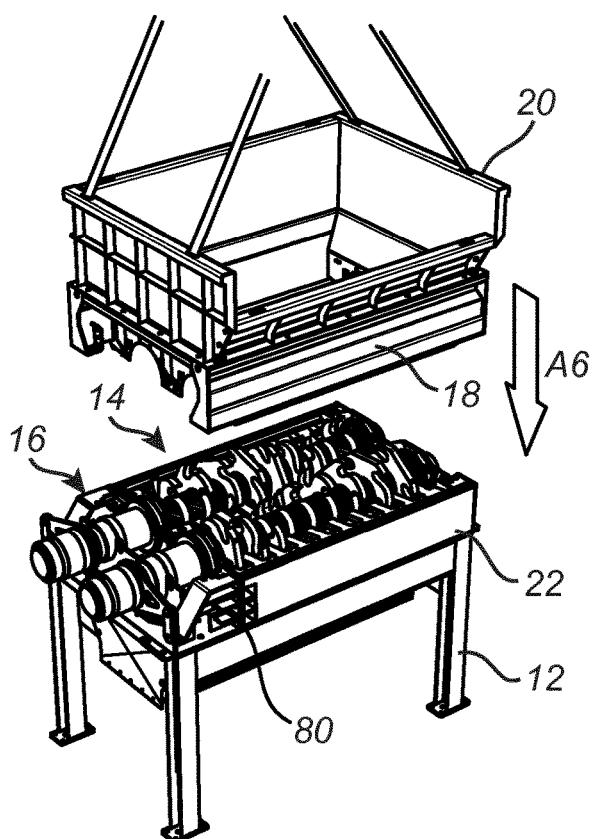
Figure 12D:
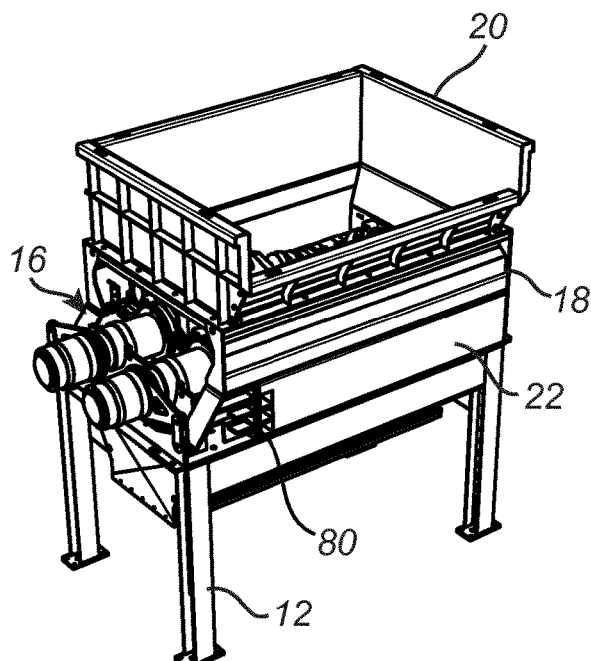

FIGS. 12a to 12d illustrate the reverse steps indicated by arrows A4 to A6. In FIG. 12a, a new complete cutting module 16 may replace the worn-out cutting module 16 removed in FIGS. 11a to 11d. As an alternative, only the cutting table unit 22 is worn out and replaced. As another alternative, only one or both cutting shafts 24 are replaced. In FIG. 12c, when lowering the top module 18 onto the cutting module 16, the angled profiles 142 will assist in guiding the top module 18 to its correct transverse position.

Figure 13A:
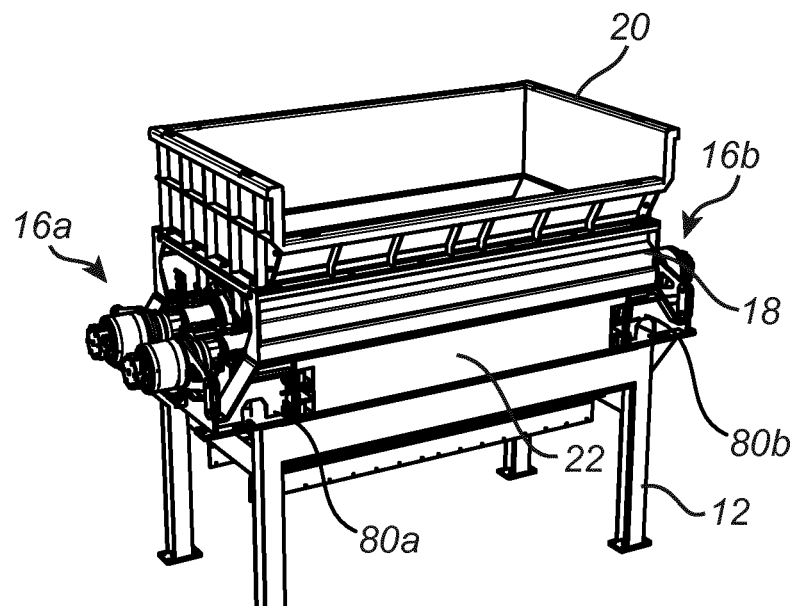
FIGS. 13a to 13e and FIGS. 14a to 14e illustrate an alternative embodiment with two drive modules and method steps for replacing a cutting module in such an alternative embodiment.

FIG. 13a illustrates an alternative embodiment of an apparatus according to the invention. This embodiment comprises two drive modules 16a and 16b of the same design as the drive module 16, one drive module at each end of the single cutting module 14. Such an alternative embodiment may be preferred in large-size versions of the inventive apparatus. Each drive module 16a and 16b is detachably connected to the single cutting module 14 by the same type of connectors as described above at the interface P2. A detailed description of these connectors will therefore not be necessary. Accordingly, the single cutting module 14 is of the same design as in the first embodiment, but will present opposite end walls designed as the proximal end wall 30 in the first embodiment with the associated connectors. Each cutting shaft 36 will be provided with two coupling flanges 46, detachably connected to drive units on the two drive modules 16a, 16b, such that each shaft is driven by two drive units. In some embodiments, the cutting table unit 22 does not have to be connected directly to the supporting structure 22, since it is securely connected at both ends to the two drive units 16a, 16b.

Reference is now made to FIGS. 13b to 13e and FIGS. 14a to 14e, illustrating method steps for replacing/substituting wear parts of an apparatus of the kind illustrated in FIG. 13a.

Figure 13B:
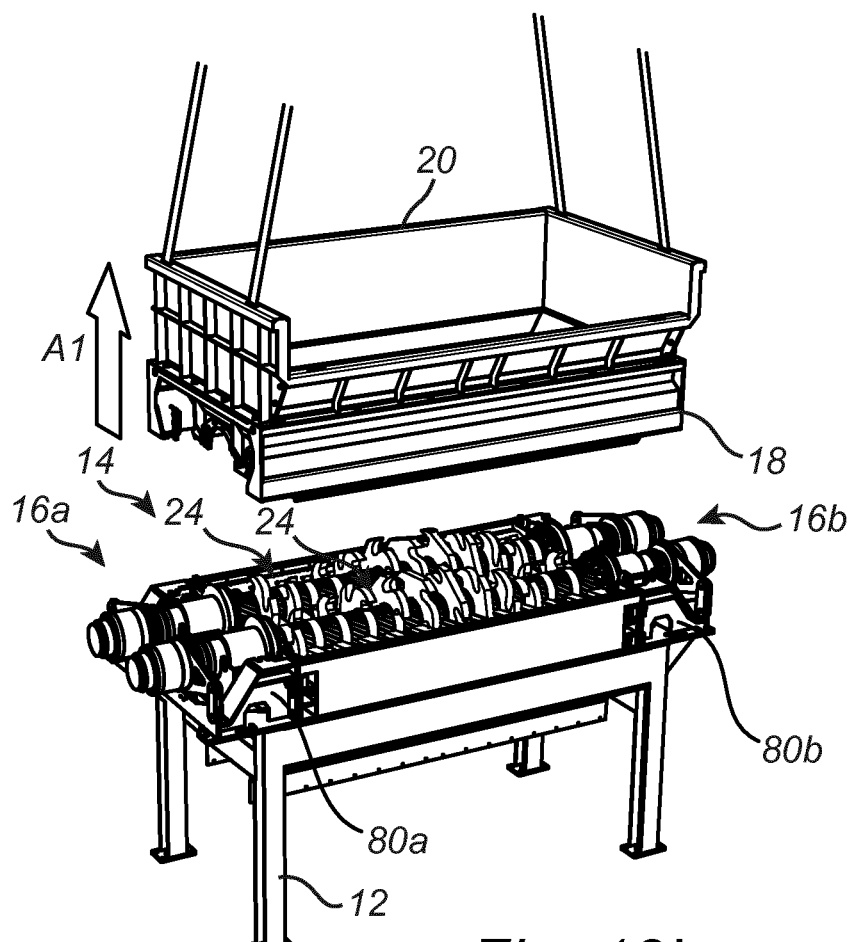

FIG. 13b illustrates a first step in which the top module 18, which extends over both cutting modules 16a, 16b, have been disconnected from the cutting modules 16a, 16b and thereafter lifted up (arrow A1) from the cutting module 14 and the drive modules 16a, 16b together with the hopper 20. The top module 18 and the hopper 20 may be temporarily positioned on the floor next to the apparatus. Obviously, the hopper 20 may be lifted away separately also. The cutting module 14 and the drive modules 16a, 16b are now completely accessible.

Figure 13C:
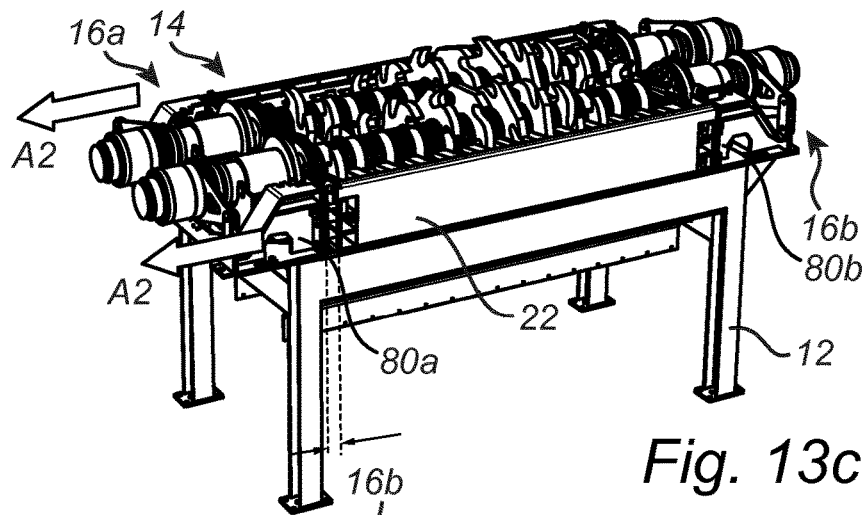

FIG. 13c illustrates a second step in which the cutting module 14 has been disconnected from both drive modules 16a, 16b. Each drive module 16a, 16b may advantageously remain connected to the chassis 12. The drive units of each drive module 16a, 16b may advantageously remain connected to the hydraulic hoses. Disconnecting the drive modules 16a, 16b involves disconnecting the coupling flanges from each other at four instances, and disconnecting the cutting table unit 22 from the body 80a, 80b of each drive module 16a, 16b. The left drive module 16a has been loosened from the chassis 12 such that it may be displaced slightly away from the cutting module 14, as indicated by arrows A2.

Figure 13D:
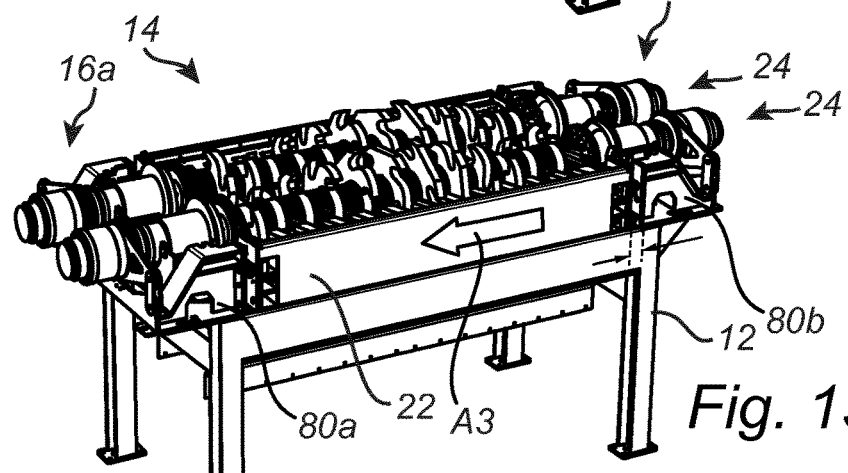

FIG. 13d illustrates a third step in which the cutting module 14 is moved horizontally away from the right drive module 16b by a sliding movement (arrow A3) along the top of the chassis 12. This may be needed in case the connection at the vertical interfaces P2 requires such an initial horizontal movement, for instance due to the female/male structure 54, 56 illustrated in FIG. 7 or due to the specific design of the connectors in the interfaces P2. In other embodiments, such an initial horizontal movement may be dispensed with.

Figure 13E:
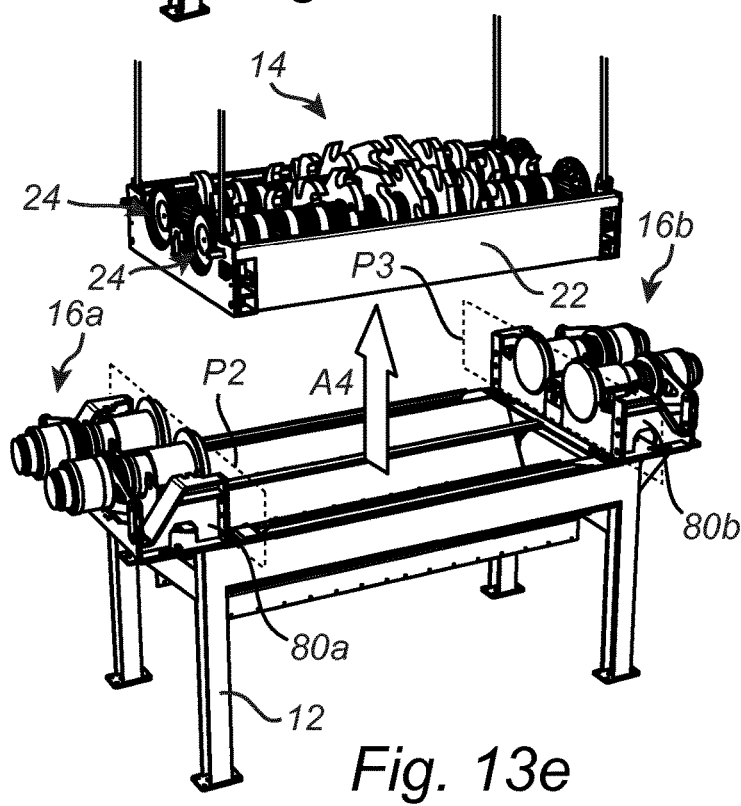

FIG. 13e illustrates the next step where the complete cutting module 16 is now free and can be lifted up (arrow A4) and away from the chassis 12 by lifting straps or the like connected to the lifting tabs 74 of the cutting table unit 22. It may be noted that the cutting module 16 in this embodiment is can be completely free to be lifted once the right and left interfaces P2 has been disconnected.

Figure 14A:
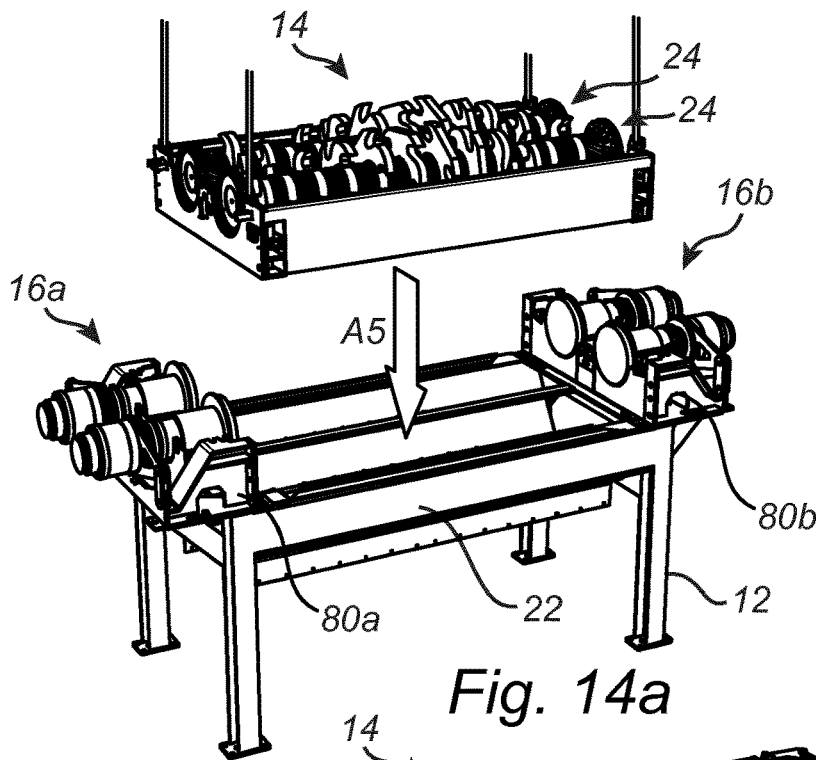
Figure 14B:
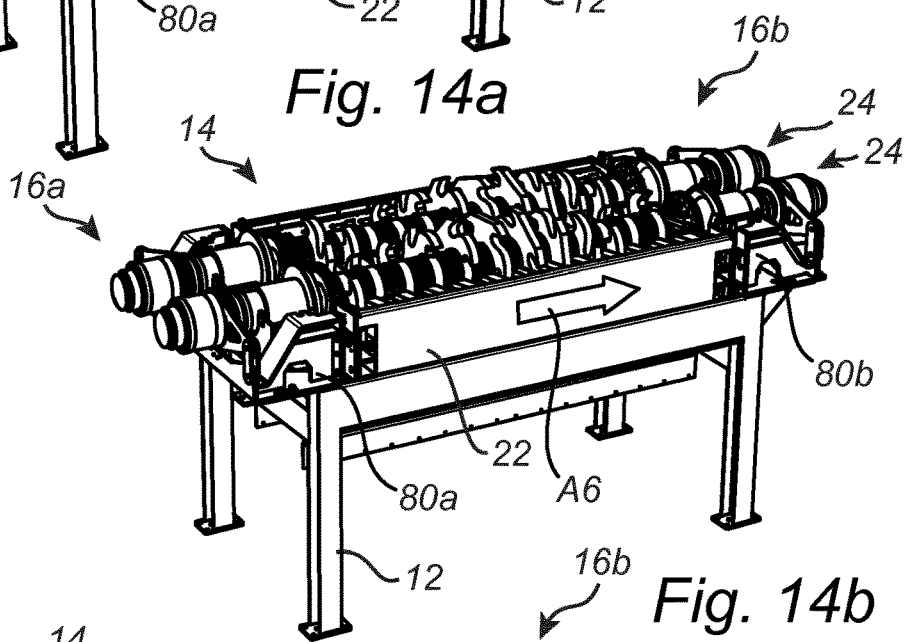
Figure 14C:
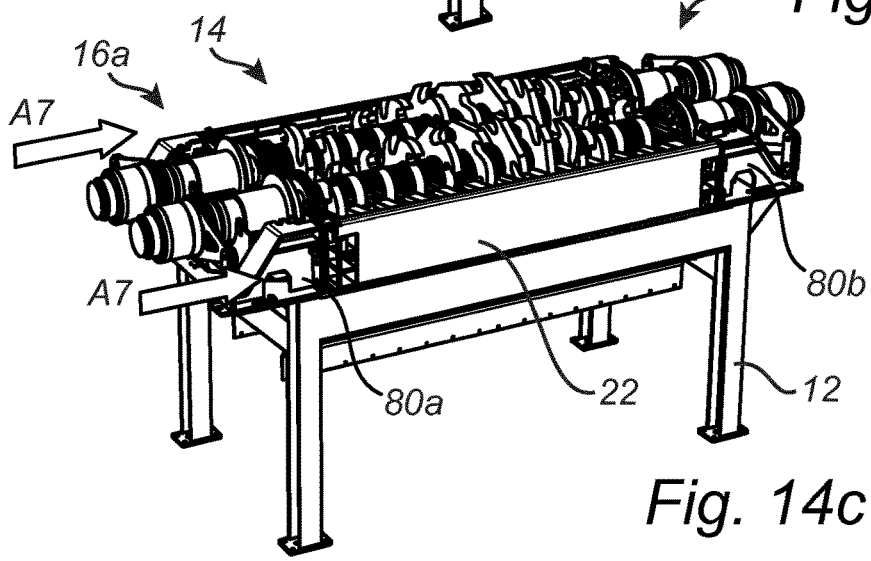
Figure 14D:
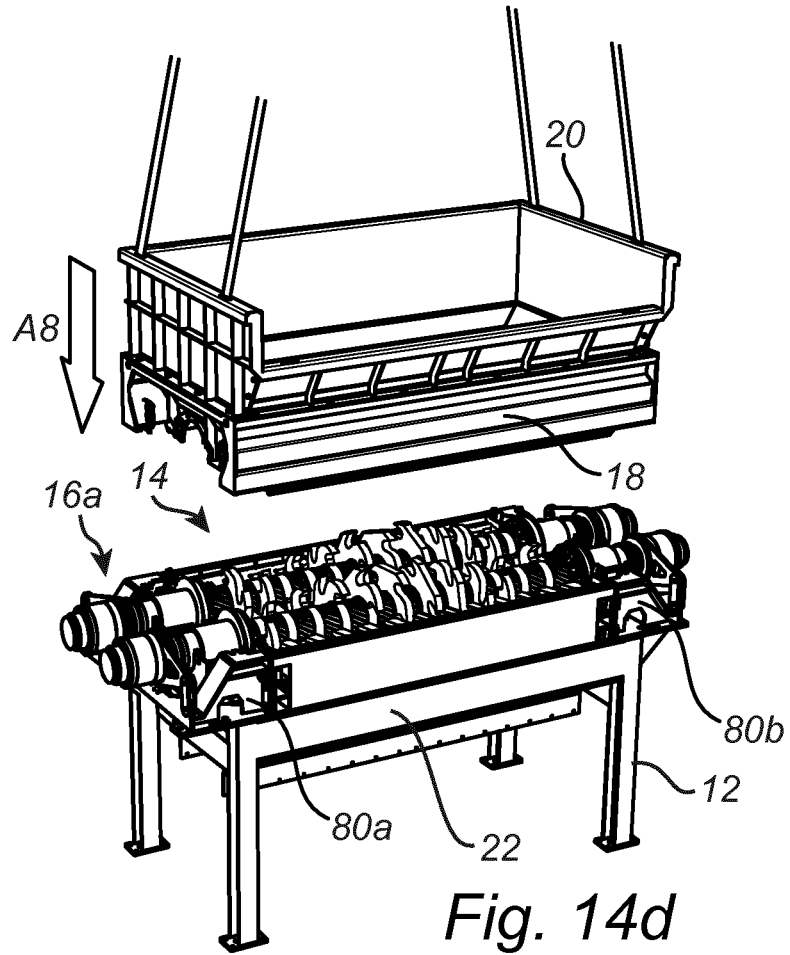
Figure 14E:
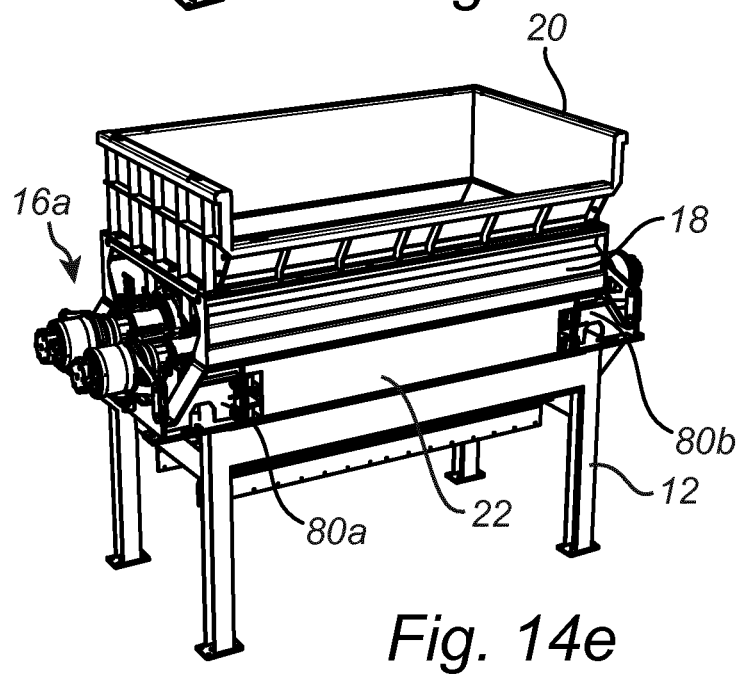

FIGS. 14a to 14e illustrate the reverse steps indicated by arrows A5 to A8. In FIG. 14a, a new complete cutting module 16 may replace the worn-out cutting module 16 removed in FIGS. 11b to 11e. As an alternative, only the cutting table unit 22 is worn out and replaced. As another alternative, only one or both cutting shafts 24 are replaced.

The invention claimed is:

1. A comminution apparatus for comminuting waste material, said apparatus comprising:
a supporting structure;
a cutting module being arranged on the supporting structure;
a top module defining a housing for receiving the waste material to be comminuted and being detachably connected to the cutting module at a first interface; and
a drive module being arranged on the supporting structure next to the cutting module;
wherein said cutting module includes:
a stationary cutting table unit which has an engagement side facing the drive module and one or more sets of fixed counter knives which define a cutting table forming a bottom of said housing, the counter knives in each set being mutually separated by openings through the cutting table, and
one or more rotatable cutting shafts which extends in an axial direction, each shaft being provided with a set of rotating knives which partly extend down into said openings through the cutting table and which during operation of the apparatus cooperate with the counter knives for comminuting the waste material;
wherein said drive module includes:
a stationary drive module body which has an engagement side facing the cutting module and which is connected to the supporting structure, and
one or more drive units which are supported by the drive module body and arranged to rotatably drive said cutting shafts;
wherein the engagement side of the cutting table unit and the engagement side of the drive module body are directly and detachably interconnected at a second interface extending transversally to the axial direction between the cutting module and the drive module; and
wherein the cutting shafts are detachably connected to the drive units.

2. The apparatus according to claim 1, wherein the cutting shafts are detachably connected to the drive units substantially along the second interface.

3. The apparatus according to claim 1, wherein the cutting table unit of the cutting module is detachably connected to the supporting structure.

4. The apparatus according to claim 1, wherein the supporting structure presents a substantially horizontal supporting area on which both the cutting module and the drive module are arranged.

5. The apparatus according to claim 1, wherein the cutting table unit comprises, in addition to the counter knives, a substantially rectangular frame in which the counter knives are fixedly arranged and which frame is formed by two axially extending side walls, a transversely extending distal end wall and a transversely extending proximal end wall; and wherein said proximal end wall defines the engagement side of the cutting table unit.

6. The apparatus according to claim 1, wherein the engagement sides of the cutting table unit and the drive module body are directly and detachably interconnected at the second interface via different connections being structured and arranged to transfer forces acting in associated different directions.

7. The apparatus according to claim 6, wherein said different connections are structured and arranged, during the operation of the apparatus, to transfer axial, vertical and transversal forces acting in the second interface between the cutting table unit and the drive module, and wherein said different connections comprise at least a first connection which is structured and arranged to transfer mainly said axial forces, at least a second connection which is structured and arranged to transfer mainly said vertical forces, and at least a third connection which is structured and arranged to transfer mainly said transverse forces.

8. The apparatus according to claim 1, wherein the second interface extends along a substantially vertical plane.

9. The apparatus according to claim 1, wherein the top module extends over at least part of the drive module.

10. The apparatus according to claim 9, wherein the top module and the drive module body are detachably interconnected in a plane substantially coinciding with the first interface.

11. The apparatus according to claim 1, wherein the first interface between the top module and the cutting module extends in a substantially horizontal plane intersecting the cutting shafts.

12. The apparatus according to claim 1, wherein each cutting shaft is detachably connected to its associated drive unit via coupling flanges which are axially located in or adjacent a flange opening, and wherein said flange opening is formed by the cutting table unit and the top module in combination.

13. The apparatus according to claim 1, further comprising a hopper, which is supported by and detachably connected to the top module.

14. The apparatus according to claim 1,
wherein the drive module constitutes a first drive module in a pair of a first and a second drive module being arranged on the supporting structure next to the cutting module on opposite sides thereof,
wherein the cutting table unit has a second engagement side facing the second drive module;
wherein the second drive module includes:
a second drive module body having an engagement side facing the cutting module and being connected to the supporting structure, and
one or more drive units being supported by the second drive module body and arranged to rotatably drive the cutting shafts together with the drive units of the first drive module;
wherein the second engagement side of the cutting table unit and the engagement side of the second drive module body are directly and detachably interconnected at a third interface extending between the cutting module and the second drive module transversely to the axial direction; and
wherein the cutting shafts are detachably connected to the drive units of the second drive module.

15. The apparatus according to claim 1, wherein the apparatus is a mobile apparatus.

* * * * *